(12) United States Patent
Mueller

(10) Patent No.: US 6,550,200 B1
(45) Date of Patent: Apr. 22, 2003

(54) ANCHOR INTERCONNECT DEVICE

(76) Inventor: Lee W. Mueller, 4132 S. Rainbow Blvd., PMB #247, Las Vegas, NV (US) 89103

( * ) Notice: Subject to any disclaimer, the term of this patent is extended or adjusted under 35 U.S.C. 154(b) by 0 days.

(21) Appl. No.: 09/594,671

(22) Filed: Jun. 16, 2000

Related U.S. Application Data

(60) Provisional application No. 60/139,542, filed on Jun. 16, 1999.

(51) Int. Cl.[7] .................................................. F16B 9/00
(52) U.S. Cl. ............................. 52/296; 52/295; 52/698; 403/232.1; 403/190
(58) Field of Search ................................. 52/167.1, 712, 52/698, 294, 296, 297, 702, 714, 295; 403/190, 232.1

(56) References Cited

U.S. PATENT DOCUMENTS

| | | | |
|---|---|---|---|
| 140,526 A | | 7/1873 | Munson, Jr. |
| 2,780,936 A | * | 2/1957 | Hillberg ..................... 52/710 |
| 3,037,593 A | | 6/1962 | Webster |
| 3,328,927 A | | 7/1967 | Kates |
| 3,822,521 A | | 7/1974 | Lucas |

(List continued on next page.)

OTHER PUBLICATIONS

Fahim Sadek, Bijan Mohraz, Andrew W. Taylor, and Riley M. Chung, "Passive Energy Dissipation Devices for Seismic Applications", NISTIR 5923, United States Department of Commerce Technology Administration, Nov. 1996.
PACO The Engineered Steel Company brochure.
Light Beam System, Low Cost Steel Frame Housing, Light Beam Inc., Brochure, Jan. 1997.
Light Beam System, LBN Shear Panel, Light Beam, Inc. Brochure, Jan. 1997.
Ultra–Span Prefabricated Light Gauge Steel Truss System, MiTek, Brochure, 1996.
CeeWal brochure Jul. 1999.
Zwall, Strength Where You Need It, brochure.
ICBO Evaluation Service, Inc., Evaluation Report, Strong––Wall Shear Panels, Simpson Strong Tie Company, PFC–5485, Feb. 1, 1999.
Strong–Wall Shearwall, Simpson Strong Tie brochure, 1999.
Shear Max™ Panel, Product description brochure, 1998, 1 page.
Shear Max™ Panel, Installation Instructions, 1 page.
Shear Max™ Panel, Product description, Sep. 1, 1998, 1 page.
Multi–Directional Insert, Typical Application Comparisons, Product description, 4 pages.
SEMCO, Metal Connectors, Southeastern Metals Manufacturing Company, Inc., Catalog 1997–1998.
Simpson, Strong–Wall Shearwall, Strong–Tie Connectors, ICBO# PFC–5485, Catalog, Mar. 1999–Jun. 2000.

*Primary Examiner*—Carl D. Friedman
*Assistant Examiner*—Jennifer I. Thissell
(74) *Attorney, Agent, or Firm*—Knobbe, Martens, Olson & Bear, LLP

(57) ABSTRACT

An assembly to secure a shear assembly and attached building wall to a building foundation in order to resist uplift forces and to transfer vertical weight loads to the foundation. The assembly provides a degree of motion perpendicular to the plane of the wall in order to accommodate misplacement of anchor structures set in the building foundation. The assembly is configured and is attached to anchor structures in such a way as to accommodate a variety of protrusions of the anchor structures from the building foundation. The assembly provides additional convenience of use by being substantially pre-assembled. The assembly is also adapted to interconnect structural members in multi-story buildings.

41 Claims, 14 Drawing Sheets

U.S. PATENT DOCUMENTS

| | | |
|---|---|---|
| 3,871,153 A | 3/1975 | Birum, Jr. |
| 3,894,370 A | 7/1975 | Parazader |
| 4,078,350 A | 3/1978 | Ting |
| 4,486,998 A | 12/1984 | Hague |
| 4,603,531 A | 8/1986 | Nash |
| 4,631,894 A | 12/1986 | Jerila |
| 4,641,726 A | 2/1987 | Fearon et al. |
| 4,675,238 A | 6/1987 | Karoubas |
| 4,825,621 A | 5/1989 | Jensen |
| 4,905,444 A | 3/1990 | Semann et al. |
| 5,054,251 A | 10/1991 | Kemeny |
| 5,092,097 A | 3/1992 | Young |
| 5,303,520 A * | 4/1994 | Gozdziak .................... 52/92.2 |
| 5,375,384 A | 12/1994 | Wolfson |
| 5,390,466 A | 2/1995 | Johnson et al. |
| 5,509,769 A | 4/1996 | Larson et al. |
| 5,619,837 A | 4/1997 | DiSanto |
| 5,647,186 A | 7/1997 | Donaldson |
| 5,687,529 A * | 11/1997 | Pickering .................... 52/582.2 |
| 5,706,626 A | 1/1998 | Mueller |
| 5,881,514 A | 3/1999 | Pryor |
| 5,904,025 A | 5/1999 | Bass et al. |
| 5,913,788 A | 6/1999 | Herren |
| 5,921,042 A | 7/1999 | Ashton et al. |
| 6,006,487 A * | 12/1999 | Leek ........................... 52/698 |
| 6,012,256 A | 1/2000 | Aschheim |
| 6,058,668 A | 5/2000 | Herren |
| 6,073,414 A | 6/2000 | Garris et al. |

* cited by examiner

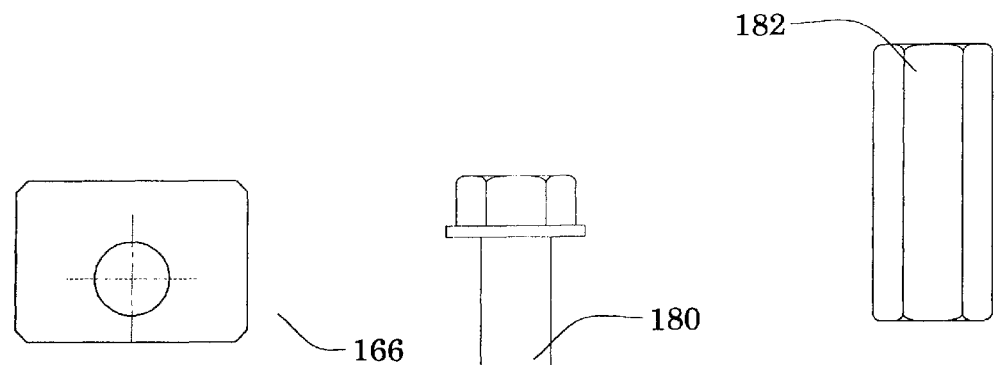
FIG. 7
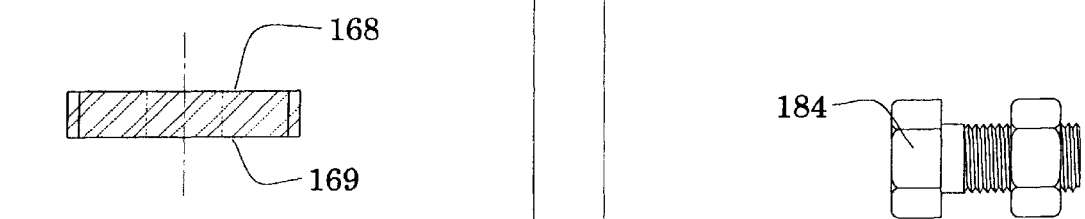
FIG. 8
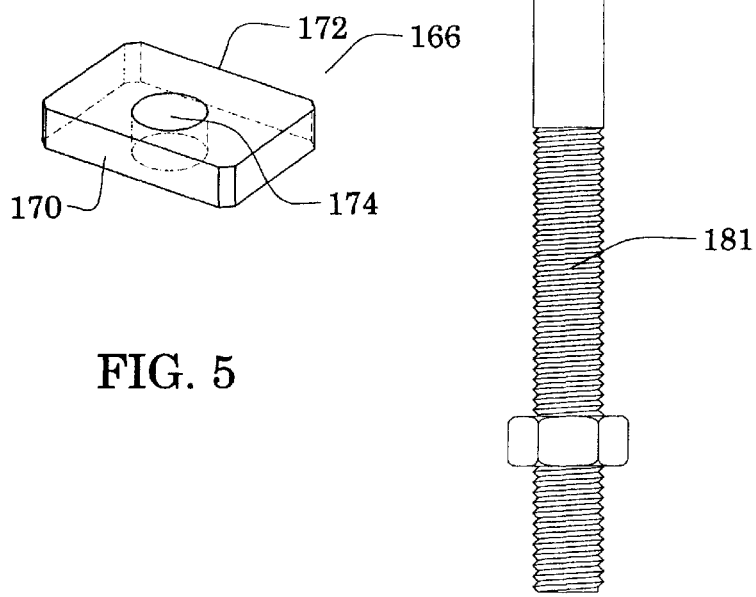
FIG. 5
FIG. 6
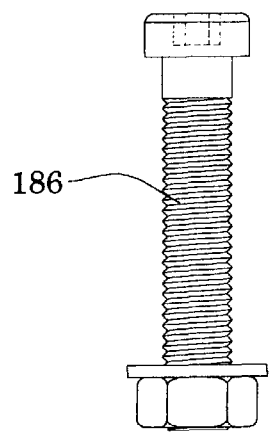
FIG. 9

ANCHOR INTERCONNECT DEVICE

RELATED APPLICATIONS

This application claims the benefit of U.S. Provisional Application No. 60/139,542 entitled Hold Down Device filed Jun. 16, 1999.

BACKGROUND OF THE INVENTION

1. Field of the Invention

The present invention relates to building construction materials and techniques and, in particular, to an assembly to interconnect building members and anchor structures.

2. Description of the Related Art

In typical residential and light industrial/commercial building frame wall construction, load bearing frame walls are comprised of a series of studs and posts that are anchored to the foundation and covered with sheathing material installed over both sides of the frame. Typically, the frame is constructed from a number of vertically extending studs that are positioned between and interconnected with upper and lower plates. The lower plates and/or vertical studs are typically anchored to the foundation in some fashion. The covering material, plywood, sheet rock, siding, plaster, etc. is then attached over the studs.

Natural forces commonly occur that impose vertical and horizontal forces on the structural elements of the buildings. These forces can occur during earth movement in an earthquake and from high wind conditions such as occur during hurricanes, tornadoes, cyclones, or other extreme weather conditions. If these forces exceed the structural capacity of the building, they can cause failures leading to damage to or the collapse of the building with resultant economic loss and potential injuries and loss of life.

In order to mitigate these natural forces, prudent architectural engineering design and practice and many building codes require the use of what is known as lateral shear reinforcement. Shear reinforcement is a two-fold process. A first facet involves strengthening the structure of a wall to increase the capacity of a wall to resist horizontal deflection of the top member relative the bottom member in the plane of the wall. The second facet of shear reinforcement involves positively attaching the wall structure to the underlying foundation to inhibit uplift and overturning of the wall assembly from the foundation. If a building lifts off the foundation, it suffers further damage when gravity draws it back into contact with the ground. Effective shear reinforcement must be resistant to repeated, cyclic forces over a period of time.

With wood frame construction, wall strengthening has been traditionally accomplished with a method known as sheathing the frame structure with a diaphragm. Typically, this involves attaching a solid sheet of material, such as plywood, oriented strand board, gypsum board, cement plaster, sheet steel, etc. to the wall studs with nails or screws. The sheathing is nailed or screwed around the periphery of the diaphragm to the underlying wood studs with a spacing and placement determined by engineering analysis. Diaphragms employ commonly available materials and tools and utilize known construction techniques.

An alternative method of strengthening walls in common practice incorporates what are known as shear panels that can offer strength and labor and material advantages over sheathing an entire structure. Concentrated shear panel members are panels or other reinforcing shapes that are highly resistant to deformation and that are interconnected with the vertical frame studs or posts of the building frame. Shear panel members can be supplied as pre-assembled units that are installed at the construction site or can be assembled in place at the job site.

A typical method of securing a frame to a foundation is to connect one end of a length of metal strapping to an end of wall stud and to embed the other end in the concrete foundation. Uplift forces acting on the building frame are resisted through the embedded strap. The use of metal strapping is convenient to install, but has strength limitations to inhibit uplift.

An alternative method of anchoring the building involves attaching metal brackets, commonly referred to as hold-downs, directly to frame studs or end posts of the shear member which are in turn attached to anchors comprised of bolts or threaded rods embedded in a concrete foundation. While having greater capacity than metal strapping, the bracket hold-down method of anchoring a building frame has some potential installation complications. If the anchor extends too far above the foundation surface, many existing hold-down designs can not be used or at least require that the worker carefully remove some of the anchor length in a manner that does not damage the threads thereby preventing the proper attachment of the securing fastener. If the anchor does not extend far enough from the foundation surface, no provision is made to allow for the deficit and the assembly is unusable resulting in time delays and costly rework.

A second installation complication concerns the placement of the hold-downs. Hold-downs are typically used in pairs and are placed at each frame stud or end post that encloses the diaphragm or shear panel member. Corresponding anchors are set in pairs into the foundation. Prudent construction practice involves the utilization of setting templates which hold the anchors in place while concrete is poured around them. The anchors are held in place with the templates that hold them upright and fix their location until the concrete is poured and sets. The templates accurately set the relative spacing of the anchor pairs. However there is a degree of difficulty in accurately placing all of the multiple templates that are used for a typical building frame with respect to each other and there is typically some misplacement of the anchor pairs. It can be appreciated that once an anchor is set in a foundation it is effectively permanently fixed in place.

Many existing hold-down products fit precisely over the protruding anchors with minimal clearance. Thus they fix the location of the attached studs or end posts as well. It can be seen that misplacement of the templates and anchors will cause misalignment of the wall frame sections or shear panel member end posts with resultant difficulties and delays in construction. A larger through hole can be provided in many holdowns to provide additional clearance, however this requires additional components such as washer plates to compensate for the oversized bolt hole.

Another need in existing construction materials and techniques arises with respect to the vertical loads carried by a building's frame. The gravity weight of a building and its contents direct a vertical load that is typically transferred to and carried by the vertical load bearing studs of the building's frame. These vertical studs typically bear at their lower end on a pressure treated mudsill.

A mudsill typically comprises a number of 2×4 pieces of lumber placed directly on a foundation so as to lay on the face defined by the 4" dimension and the longest dimension. A mudsill is also used as a nailing surface along the lower extent of the exterior walls. The inherent structural problem with the mudsill, comprising a wooden member, is that it has less capacity to resist crushing because of the orientation of the grain of the wood. A compressive distortion in the mudsill allows the vertical load-bearing studs to move downwards due to the incident vertical load. Compressive movement of the vertical end studs in a shear panel creates deflection in the walls of the building, weakening the overall structure, providing impetus for cracks to form in the external and interior wall finishings, and potentially concentrating load stresses in unforeseen and damaging ways. In particular, movement of frame members enclosing a shear member will pre-load the shear member and, depending on the magnitude of movement, possibly distort the shear member. Pre-loading and distortion of shear members can seriously compromise their structural strength.

Shear reinforcement becomes more complicated with multiple story buildings. A multi-story building requires shear reinforcement of even higher capacity that a single story building. The taller walls of a multi-story present a greater area for wind forces to bear on and a longer moment arm for wind and seismic forces. The ultimate capacity requirements of a shear panel reinforcement system increases rapidly as the building grow taller. Because of this, shear reinforcement is required to be incorporated into all levels of a building, including the upper level walls. The particular difficulty with shear reinforcing upper stories of a building is that shear assemblies placed within upper story walls are no longer adjacent the building's foundation as the ground level walls are. Forces from incident wind or seismic activity ultimately must be transferred to the load bearing foundation. It should also be appreciated that the previously mentioned concerns with vertical loading and damage to supporting mudsills are exacerbated with multi-story structures. Wood shrinkage over time in upper story framing contributes to problems with excessive deflection in shear panel assemblies.

From the foregoing, it can be appreciated that there is a continuing need for a method and device to continuously secure and anchor a building frame to a foundation. Moreover there is a particular need for a manner of securing shear panel assemblies to foundations in a manner that allows for both lateral or vertical misplacement of the anchoring elements in the foundation with respect to the hold-down assembly without a loss of structural integrity and capacity of the shear assembly as a whole or requiring rework. The desired anchoring method should be convenient to install, yet offer strength advantages to the existing use of metal strapping. It would be an additional advantage for the device to be capable of supporting vertical compression loads as well as tension loads to thereby enable the device to transfer loads directly to the foundation to compensate for wood shrinkage and to bypass the mudsill as a compression resisting element in the shear panel system and to allow the device to interconnect upper story shear assemblies in multi-story buildings.

SUMMARY OF THE INVENTION

The aforementioned needs are satisfied by the anchor interconnect device of the present invention which in one aspect is an assembly for interconnecting building members so as to resist tension and compression forces. The assembly is adapted to transfer both tension and compression forces along an axis such that the assembly can transfer uplift forces that impart on a building due to wind force or earth movement to an underlying foundation. Transferring the forces to a relatively massive foundation resting on and partially within the ground increases the ability of the building employing the anchor interconnect devices to resist uplift forces without suffering damage.

By transferring compression forces to the foundation through the vertical grain elements of a wood frame wall, the anchor interconnect device of the present invention directs the vertical loads arising from the weight of the building and its contents directly to the foundation. Thus, the anchor interconnect device of the present invention substantially by-passes a mudsill placed on the foundation and at the lower extent of the walls as a compressive load bearing member. The anchor interconnect device permits the weight of the building and its contents to minimally bear on the mudsill and thus minimizes the deleterious effects of wall deflection caused by the building's weight bearing on the mudsill.

In another aspect of the invention, the anchor interconnect device provides a limited freedom of motion between the anchor interconnect device and an attached building member along a second axis perpendicular to a wall of a building. By allowing a limited freedom of motion, the anchor interconnect device accommodates some misplacement of anchor structures in a foundation without requiring rework, but still substantially maintains the intended placement of walls and the full strength capacity of the anchor interconnect device.

In yet another aspect of the invention, the anchor interconnect device provides a range of motion along a first axis for interconnecting building members. By providing a range of motion, the anchor interconnect device accommodates variation in relative proximity of the building members, while still being able to interconnect them without significantly compromising the strength of the anchor interconnect device or the overall structure.

In yet another aspect, the anchor interconnect device is an assembly for interconnecting building members so as to resist tension forces. The anchor interconnect device in this aspect is intended for use in building applications that only require transfer of tension loads. The anchor interconnect device of this embodiment comprises fewer component pieces and installation steps than the device of the embodiment which transfers tension and compression loads and is thus even less expensive to produce, purchase, and install. The anchor interconnect devices of these two embodiments offer the construction trades the option of a more capacious device where needed and a somewhat simplified, lower cost device for applications which do not require the additional compression resisting capability.

The anchor interconnect device includes an attachment member with provision to allow the member to be securely attached to a structure. The attachment member is a rigid structure and reinforces the structure member against flexing and distortion due to tension and compression forces. The attachment member also provides increased area for transferring forces from the structure through the anchor interconnect device to an anchor structure, which increases the capacity of the device, in particular its resistance, to cyclic forces. In one embodiment, the anchor interconnect device also includes load transfer plates to provide additional bearing surface for the anticipated uplift and weight forces and to transfer forces through the assembly. The load transfer plates further inhibit distortion and damage to the anchor interconnect device and to the attached structure members.

It can be appreciated that the anchor interconnect device, comprising few component pieces interconnected with few common fasteners or joining methods can be readily assembled in the field. By allowing a restricted freedom of motion perpendicular to the plane of a wall, it can be seen that the anchor interconnect device can accommodate a degree of misplacement of the embedded anchor element. This will allow construction workers to more easily align the wall members together and thus improve the speed and economy of construction. By allowing the attachment of the anchor interconnect device either directly to an anchor member or with an anchor attachment member and a coupler, the anchor interconnect device provides for variation in the protrusion of the anchor member from the foundation surface. These and other objects and advantages will become more fully apparent from the following description taken in conjunction with the accompanying drawings.

BRIEF DESCRIPTION OF THE DRAWINGS

FIG. 5 shows an anchor bearing plate in three views;

FIG. 6 shows a threaded anchor member connector;

FIG. 7 shows an internally threaded coupler;

FIG. 8 shows a typical threaded assembly fastener;

FIG. 9 shows a typical threaded post fastener;

DETAILED DESCRIPTION OF THE PREFERRED EMBODIMENT

Reference will now be made to the drawings wherein like numerals refer to like parts throughout. In one embodiment, the anchor interconnect device 100 of the present invention comprises a multi-plate anchor interconnect device 102. The anchor interconnect device 100 interconnects a structure with an anchor structure 400 such that uplift and compression forces on the structure are transferred through the anchor interconnect device 100 to the anchor structure 400.

Figure 1:
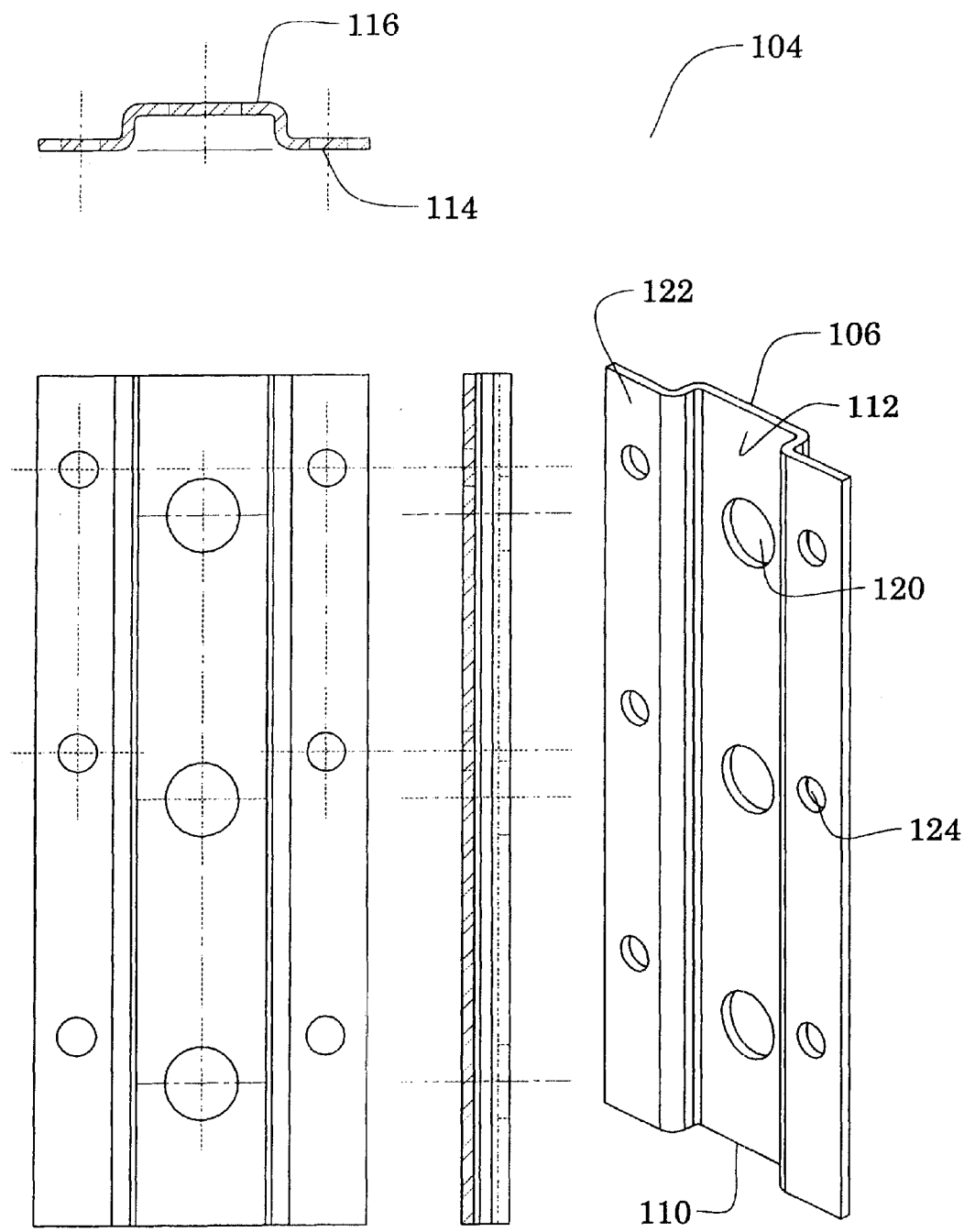
FIG. 1 shows an attachment member in four views.

The multi-plate anchor interconnect device 102 comprises an attachment member 104 as shown in FIG. 1. The attachment member 104 is generally rectangular and is made from stamped or folded sheet steel, aluminum or dense plastic. In this embodiment, the attachment member 104 has dimensions of approximately 3½"×9"×½ as shown in FIG. 1. The attachment member 104 has a top end 106 and a bottom end 110 as well as a front surface 114 and a back surface 116. The attachment member 104 attaches to a structure and also to other component pieces of the multi-plate anchor interconnect device 102 thereby securing the structure to the anchor structure 400 in a manner to be described in greater detail below.

The attachment member 104 defines a channel 112 that extends between the top end 106 and the bottom end 110 adjacent the front surface 114. The channel 112 is an elongate rectangle that is u-shaped in cross section. The attachment member 104 is provided with structure fastener holes 120 as shown in FIG. 1. The structure fastener holes 120 are approximately 25/32" in diameter and allow structure fasteners 186 to pass through the attachment member 104 and connect the multi-plate interconnect device 102 to a structure in a manner to be described in greater detail below.

The attachment member 104 also defines flanges 122. The flanges 122 are rectangular and extend outwards from the channel 112 in opposing lateral directions so as to be coplanar. The flanges 122 are an area of the attachment member 104 and are formed from the same material as the attachment member 104. The flanges 122 are provided with assembly holes 124 as shown in FIG. 1. In this embodiment, the assembly holes 124 are approximately 13/32" in diameter and pass through the flanges 122 and thereby the attachment member 104. The assembly holes 124 provide clearance for assembly fasteners 184 to pass through the assembly holes 124 and thereby the flanges 122 and attachment member 104 to locate and interconnect the attachment member 104 with other component pieces of the multi-plate anchor interconnect device 102 in a manner that will be described in greater detail below.

Figure 2:
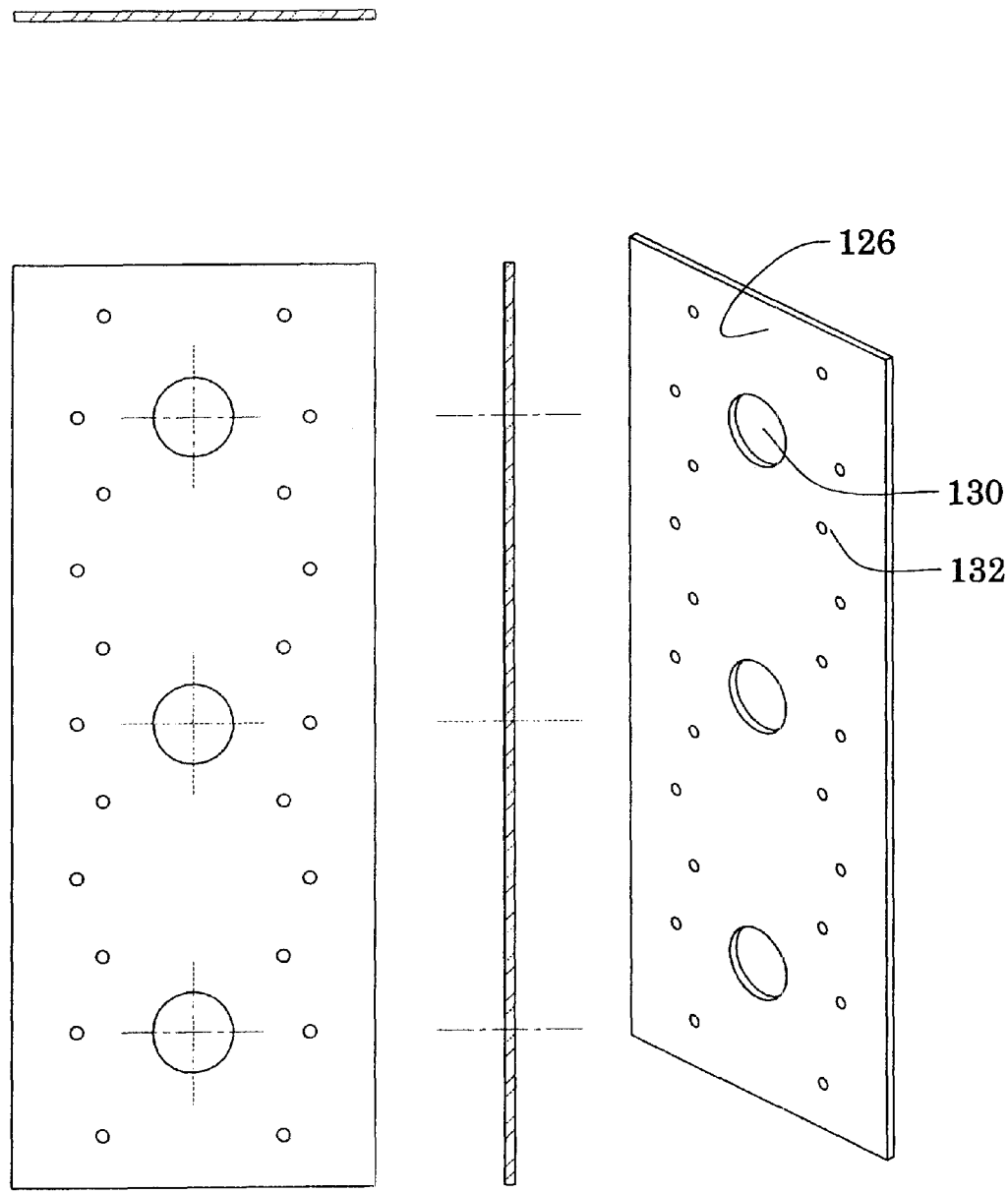
FIG. 2 shows a reinforcing plate in four views.
Figure 10A:
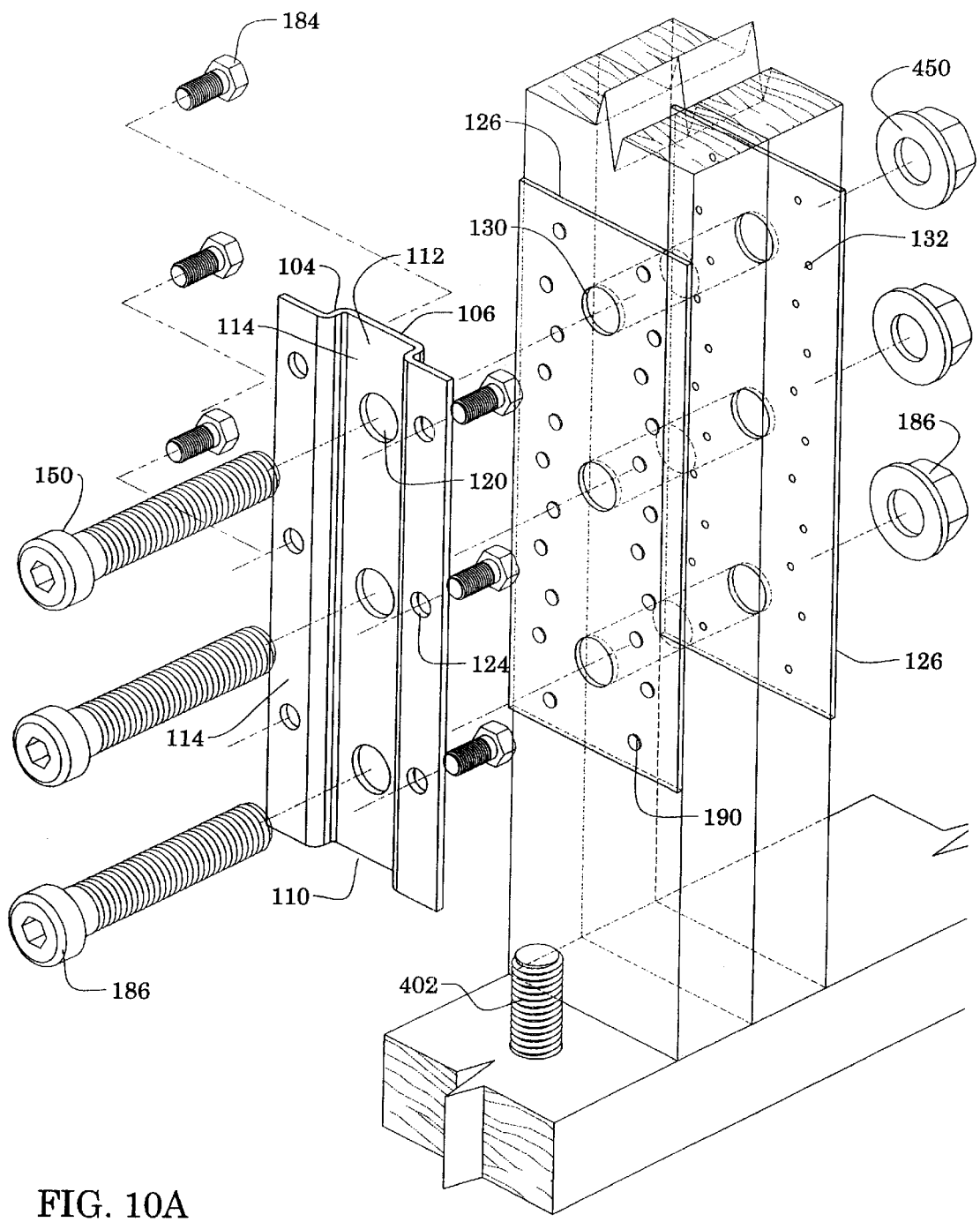
FIGS. 10a and b illustrate one manner of connecting the attachment member to a structure over the reinforcing plate and preassembling the load transfer plate and the anchor enclosure.

In one embodiment, the multi-plate anchor interconnect device 102 also comprises reinforcing plates 126 as shown in FIGS. 2 and 10a. The reinforcing plates 126 are formed of 14 gauge sheet steel and are approximately 3½" by 9". The reinforcing plates 126 comprise a plurality of structure fastener holes 130 and nailing/screw holes 132. The structure fastener holes 130 are approximately 25/32" in diameter and the nailing/screw holes 132 are approximately ⅛" in diameter. The reinforcing plates 126 are attached immediately adjacent to the structure with a plurality of nails or screws 190 such that the nails or screws 190 pass through the nailing/screw holes 132 and into the structure in a well understood manner as shown in FIG. 10a. The reinforcing plates 126 act as load transfer elements to thereby distribute stress forces on the structure to thereby inhibit damage and distortion of the structure due to localized, concentrated stresses.

Figure 3:
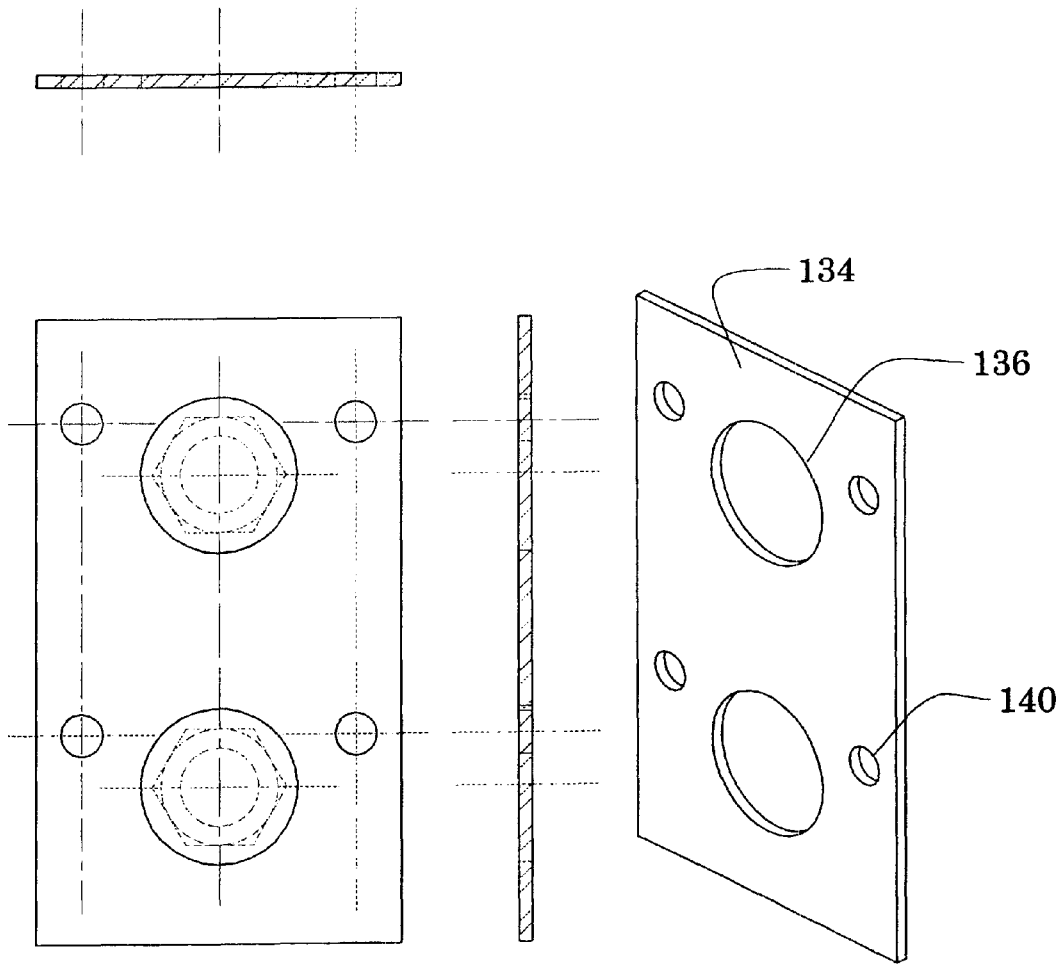
FIG. 3 shows load transfer plate in four views.

The multi-plate anchor interconnect device 102 also comprises a load transfer plate 134 shown in FIG. 3. The load transfer plate 134 is rectangular, approximately 3½"×6", and is formed from a flat sheet of steel, aluminum or dense plastic. When assembled into the multi-plate anchor interconnect device 102, the load transfer plate 134 transfers loads from the structure, through the multi-plate anchor interconnect device 102, and to the anchor structure 400 in a manner that will be described in greater detail below.

The load transfer plate 134 is provided with structure fastener clearance holes 136. In the preferred embodiment, the structure fastener clearance holes 136 are approximately 1½" in diameter and pass through the load transfer plate 134. The structure fastener clearance holes 136 provide clearance for structure fasteners 186 in a manner to be described in greater detail below.

The load transfer plate 134 is also provided with assembly holes 140 as shown in FIG. 3. In the preferred embodiment, the assembly holes are approximately 13/32" in diameter and pass through the load transfer plate 134. The assembly holes 140 allow assembly fasteners 184 to pass through the load transfer plate 134 so as to interconnect the load transfer plate 134 with the other component pieces of the multi-plate anchor interconnect device 102 in a manner that will be described in greater detail below.

Figure 4:
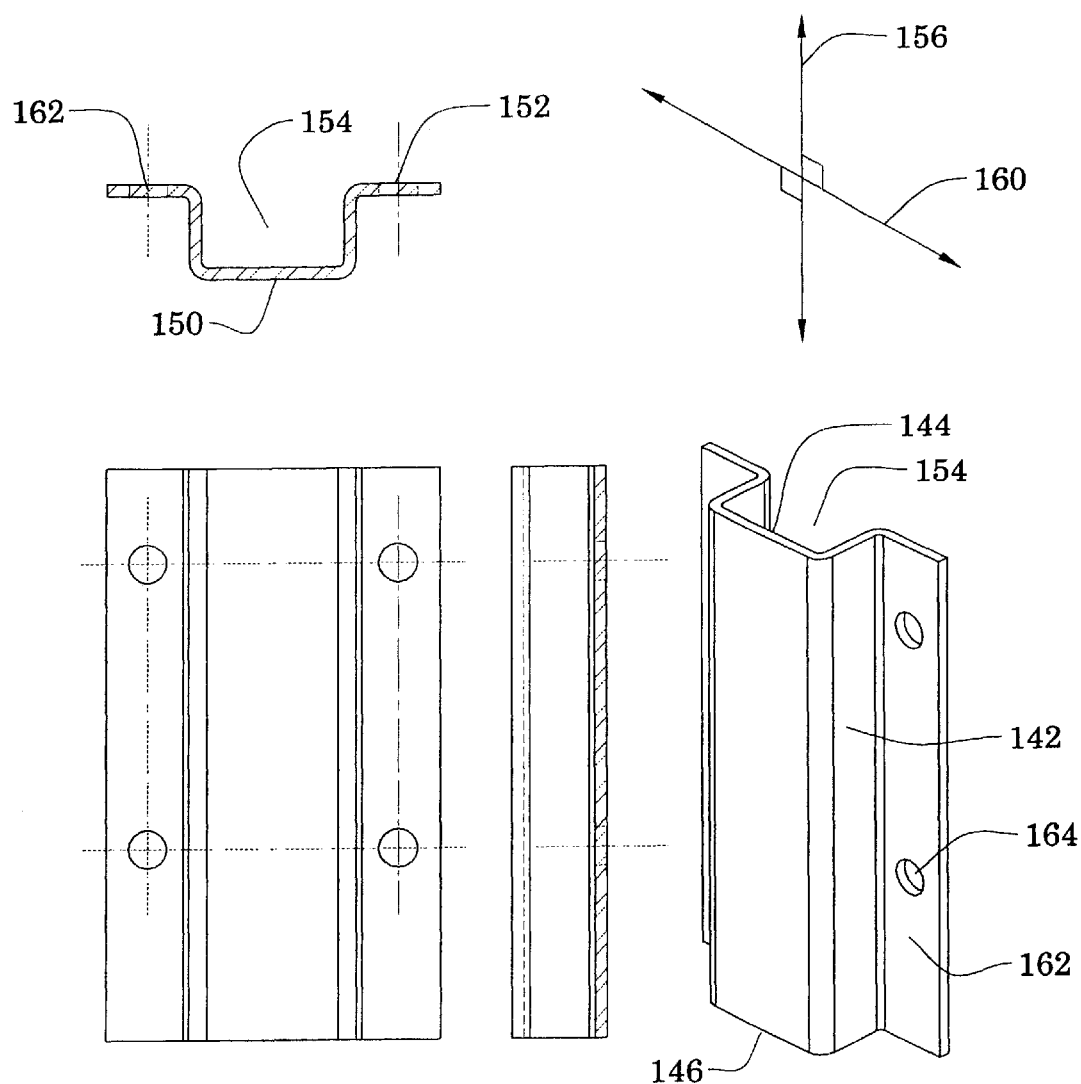
FIG. 4 shows an anchor enclosure in four views.

The multi-plate anchor interconnect device 102 also comprises an anchor enclosure member 142 as shown in FIG. 4. The anchor enclosure member 142 is generally rectangular and is made from stamped or folded sheet steel. In this embodiment, the anchor enclosure member 142 has dimensions of approximately 3½"×6"×1" as shown in FIG. 4. The anchor enclosure member 142 has a top end 144 and a bottom end 146 as well as an outer surface 150 and an inner surface 152. The anchor enclosure member 142 encloses an anchor structure 400 and acts as a load bearing and transfer surface for the multi-plate anchor interconnect device 102 in a manner that will be described in greater detail below.

The anchor enclosure member 142 defines a containment cavity 154 as shown in FIG. 4. The cavity 154 is generally an elongate rectangle extending along a first axis 156 between the top end 144 and bottom end 146 adjacent the inner surface 152 that is rectangular in cross section and is approximately 6"×1¾"×1". The cavity 154 is sized and configured to receive the anchor structure 400 and allow for a limited freedom of motion along a second axis 160 perpendicular to the first axis 156 in a manner that will be described in greater detail below.

The anchor enclosure member 142 also defines flanges 162. The flanges 162 are rectangular and extend outwards from the cavity 154 in opposing lateral directions so as to be coplanar. The flanges 162 are an area of the anchor enclosure member 142 and are formed from the same material as the anchor enclosure member 142. The flanges 162 are provided with assembly holes 164 as shown in FIG. 4. In this embodiment, the assembly holes 164 are approximately 13/32" in diameter and pass through the flanges 162 and thereby the anchor enclosure member 142. The flanges 162 locate and interconnect the anchor enclosure member 142 with the other component pieces of the multi-plate anchor interconnect device 102 in a manner that will be described in greater detail below.

The multi-plate anchor interconnect device 102 also comprises an anchor bearing plate 166 shown in FIG. 5. The anchor bearing plate 166 is rectangular and is made from steel, aluminum plate, or dense plastic. In this embodiment, the anchor bearing plate 166 is approximately 2½"×1¾"×½" as shown in FIG. 5. The anchor bearing plate 166 has an outer face 170, an inner face 172, a top surface 168, and a bottom surface 169. The anchor bearing plate 166 spreads out uplift forces from the structure, through the multi-plate anchor interconnect device 102, to the anchor structure 400 in a manner to be described in greater detail below. The anchor bearing plate 166 is provided with an anchor member hole 174 as shown in FIG. 5. The anchor member hole 174 passes through the anchor bearing plate 166. In the preferred embodiment the anchor member hole 174 has a through diameter of approximately 13/16" and is placed as shown in FIG. 5. The anchor member hole 174 provides clearance in the anchor bearing plate 166 to allow attachment of the multi-plate anchor interconnect device 102 to the anchor structure 400 in a manner to be described in greater detail below.

Figure 12:
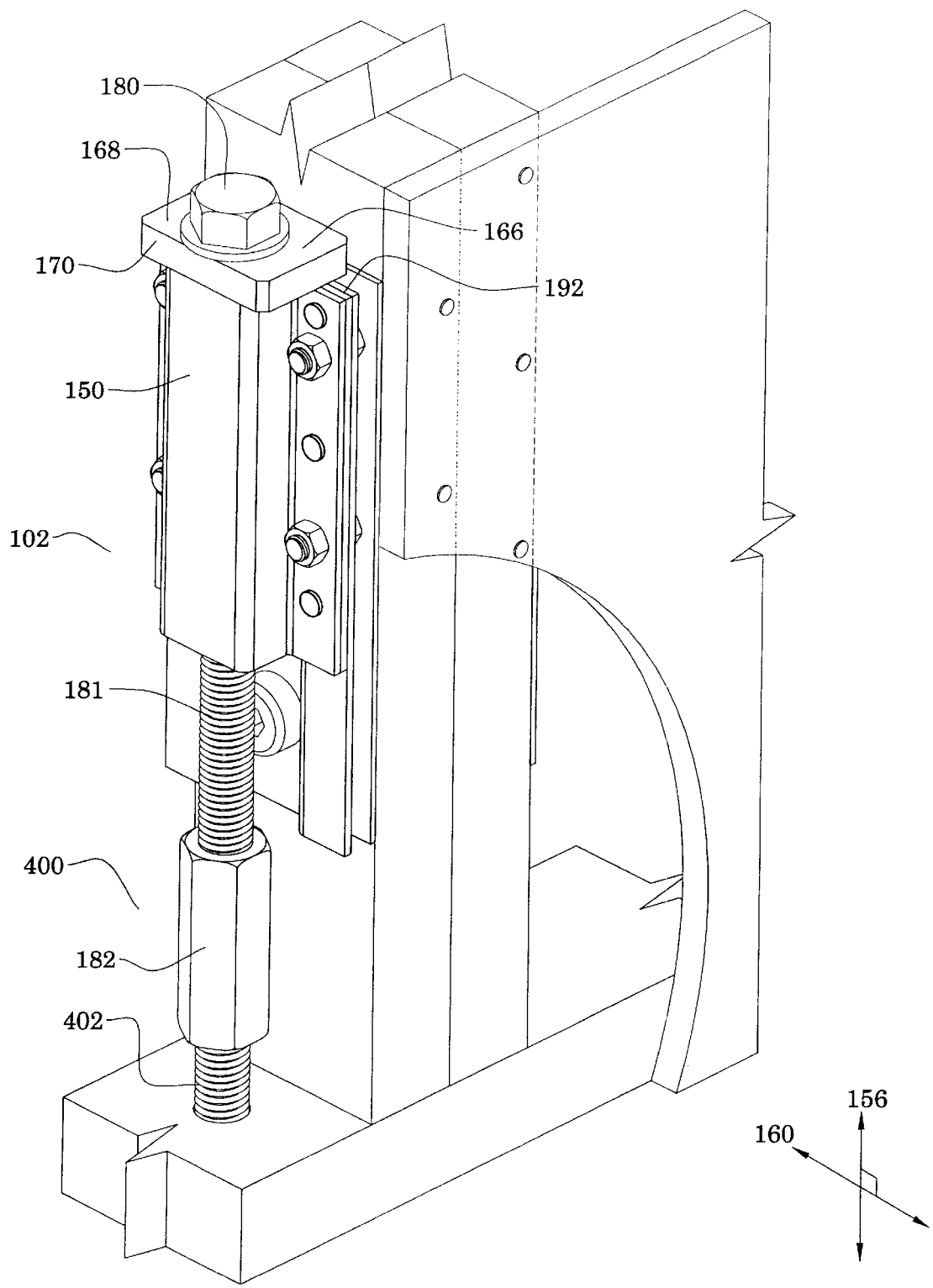
FIG. 12 illustrates a multi-plate anchor interconnect device interconnecting a structure and an anchor member as well as a cutaway view of an attached shear diaphragm.

The anchor interconnect device 100 comprises an anchor structure 400, shown in one embodiment in FIG. 12. The anchor structure 400 is fixedly attached to the anchor interconnect device 100 and a building foundation and transfers tension and compression forces on the structure, through the anchor interconnect device 100, to the foundation in a manner that will be described in greater detail below.

The anchor structure 400 comprises an anchor member connector 180 as shown in FIG. 6. In this embodiment, the anchor member connector 180 comprises a ¾" by 11" high strength hex head bolt. The anchor member connector 180 includes a threaded shaft 181 as shown in FIG. 6. The threaded shaft 181 is an integral part of the anchor member connector 180 and is dimensioned so as to extend completely through the containment cavity 154 of the anchor enclosure member 142. The threaded shaft 181 and thereby the anchor member connector 180 is provided with external threads to thereby mate with an internally threaded nut or other fastener in a well known manner. The anchor member connector 180 connects the other components of the anchor interconnect device 100 to the anchor structure 400 in a manner to be described in greater detail below.

The anchor structure 400 also comprises a coupler 182 as shown in FIG. 7. In this embodiment, the coupler 182 comprises a ¾" standard coupler, internally threaded so as to mate with the anchor member connector 180 and an anchor member 402.

The anchor structure 400 also comprises an anchor member 402 as shown in FIGS. 10a and b. The anchor member 402 is a threaded rod or bolt and is fixedly set in the building foundation, either cast directly in the foundation or affixed on a retrofitted basis with epoxy adhesives. The anchor member 402 includes a threaded shaft 404. The threaded shaft 404 extends upwards along the first axis 156 beyond the surface of the foundation. The threaded shaft 404 is a ¾" rod, externally threaded so as to correspond to the threading of the anchor member connector 180 and also so as to mate with the coupler 182.

The multi-plate anchor interconnect device 102 also comprises a plurality of assembly fasteners 184 as shown in FIG. 8. In one embodiment, the assembly fasteners 184 comprise standard ⅜" by ¾" cap screws and nuts of a type well known in the art. In an alternative embodiment, the assembly fasteners 184 comprise standard ⅜" by ¾" hex head bolts and nuts also of a type well known in the art. The assembly fasteners 184 connect the attachment member 104, the load transfer plate 134, and the anchor enclosure member 142 in a manner that will be described in greater detail below.

The multi-plate anchor interconnect device 102 also comprises a plurality of structure fasteners 186. In one embodiment, the structure fasteners 186 comprise ¾" by 5" standard cap screws and nuts. In an alternative embodiment, the structure fasteners 186 comprise ¾" by 5" standard hex head bolts and nuts. The structure fasteners 186 connect the attachment member 104 and thus the multi-plate anchor interconnect device 102 to the structure in a manner that will be described in greater detail below. It should be appreciated that the assembly fasteners 184 and structure fasteners 186 can be adapted to include washers, lock washers, and/or self-locking nuts by one skilled in the art.

Figure 10B:
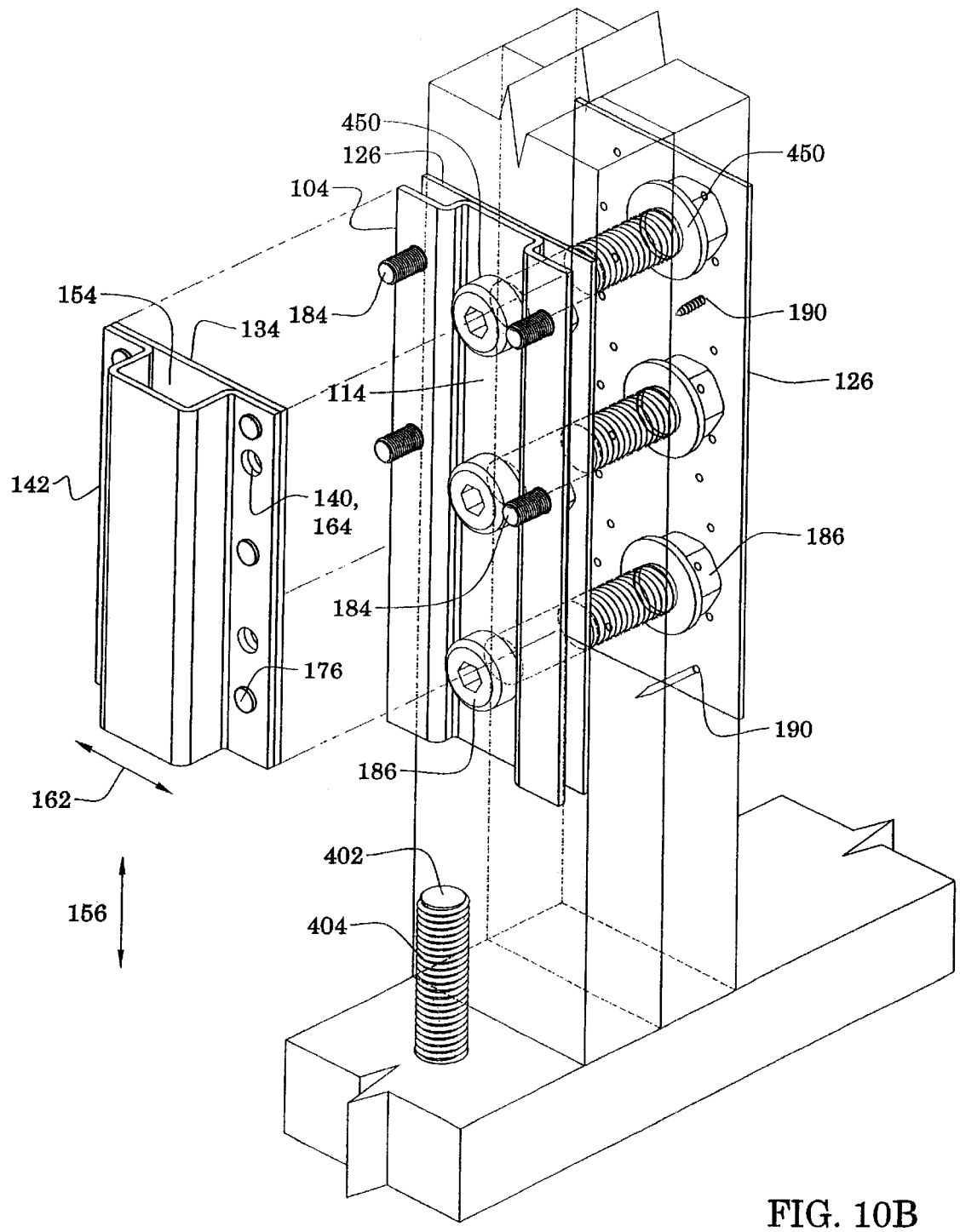

In one embodiment, the anchor enclosure member 142 and load transfer plate 134 are interconnected as illustrated in FIG. 10b. The inner surface 152 of the anchor enclosure member 142 is positioned adjacent the load transfer plate 134 such that the assembly holes 164 are respectively aligned with the corresponding assembly holes 140. The anchor enclosure member 142 and load transfer plate 134 are interconnected with plurality of clinches 176. Clinching is a method well known in the art which comprises applying high pressure with dies so as to swage two or more pieces of material together. Clinching the anchor enclosure member 142 and the load transfer plate 134 provides additional convenience of use by pre-aligning and pre-connecting the anchor enclosure member 142 and the load transfer plate 134. This makes the multi-plate anchor interconnect device 102 easier to install in the field, by eliminating the need for a construction worker to place and hold the anchor enclosure member 142 and the load transfer plate 134 in alignment during installation. It should be appreciated that the clinches 176 herein described can be replaced with spot welds, high strength adhesives, rivets, or other methods and/or devices for joining material together by one skilled in the art without detracting from the spirit of this invention.

FIG. 10b also illustrates one embodiment of attaching the attachment member 104 to a structure. In this embodiment, the structure comprises wood studs and the structure should be provided with a plurality of through-going holes. It will be appreciated, however, that the anchor interconnect device 100 can be used in conjunction with any of a number of different structures without departing from the present invention. The holes in the structure should be approximately 25/32" or greater in diameter and be placed near the lower end of the structure along a vertical center line with a spacing of approximately 3" between the lower hole and the middle hole and 2½" between the middle hole and the upper hole and further so as to be in alignment with the structure fastener holes 130 of the reinforcing plate(s) 126. Assembly fasteners 184 are placed through the assembly holes 124 of the attachment member 104 so as to bear on the back surface 116 and so as to extend out of the front surface 114. The attachment member 104 is then positioned immediately adjacent a first reinforcing plate 126 which is attached to the structure such that the back surface 116 is adjacent the first reinforcing plate 126 and the structure fastener holes 120 are each respectively aligned with the corresponding hole provided in the structure and the structure fastener holes 130 of the reinforcing plate(s) 126. Structure fasteners 186 are placed through the attachment member 104, the reinforcing plates 126, and the structure such that the structure fasteners 186 bear on the front surface 114. The structure fasteners 186 are tightened so as to draw the attachment member 104, the reinforcing plates 126, and the structure together in compression in a well known manner. When so attached the attachment member 104 is fixedly mounted to and adjacent the structure.

Figure 11:
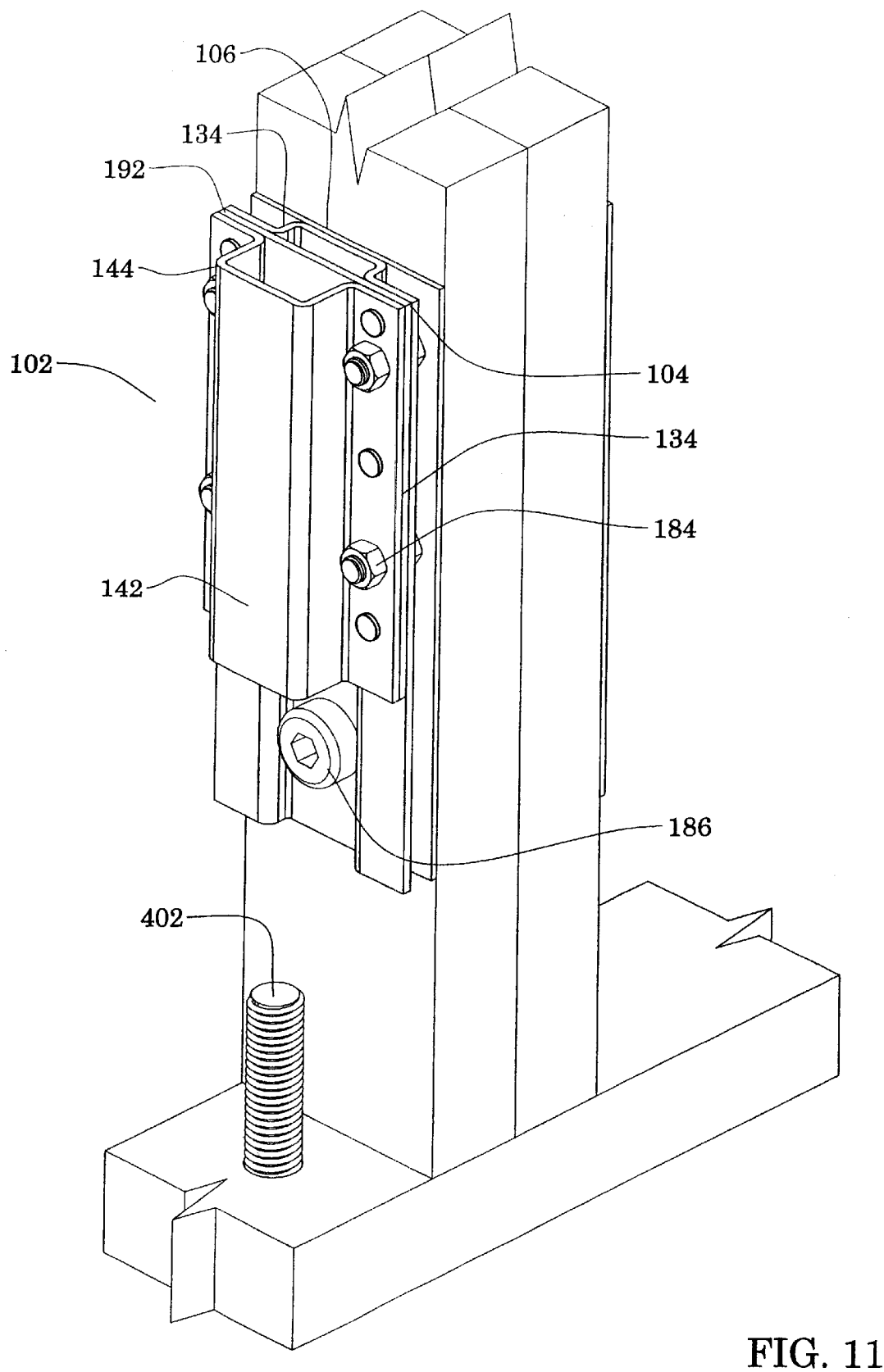
FIG. 11 illustrates a multi-plate anchor interconnect device attached to a structure.

FIG. 11 illustrates one embodiment of an assembled multi-plate anchor interconnect device 102 attached to a structure. The anchor enclosure member 142 and the load transfer plate 134 are positioned adjacent the attachment member 104 such that the load transfer plate 134 is adjacent the front surface 114 of the attachment member 104 and also such that the assembly holes 124, 140, and 164 are all respectively aligned and also such that the assembly fasteners 184 pass through the assembly holes 124, 140, and 164. The structure fastener clearance holes 136 of the load transfer plate 134 provide clearance for the structure fasteners 186 to pass through as needed. The assembly fasteners 184 are tightened so as to draw together the anchor enclosure member 142, the load transfer plate 134, and the attachment member 104 thereby forming the multi-plate anchor interconnect device 102.

As shown in FIG. 11 with the solid shading, the multi-plate anchor interconnect device 102 defines a tension load bearing surface 192. The tension load bearing surface 192 comprises the top end 106 of the attachment member 104, the load transfer plate 134, and the top end 144 of the anchor enclosure member 142 when the attachment member 104, the load transfer plate 134, and the anchor enclosure member 142 are interconnected together. The tension load bearing surface 192 provides a surface for transferring uplift forces from the structure, through the multi-plate anchor interconnect device 102, to the anchor structure 400 in a manner to be described in greater detail below.

FIG. 12 illustrates one embodiment of attaching the multi-plate anchor interconnect device 102 to a structure and the anchor structure 400. The anchor member connector 180 is placed through the anchor bearing plate 166 such that the anchor member connector 180 bears on the top surface 168 of the anchor bearing plate 166. The anchor member connector 180 and anchor bearing plate 166 are positioned such that the anchor member connector 180 passes through the cavity 154 of the anchor enclosure member 142 and such that the bottom surface 169 of the anchor bearing plate 166 is adjacent the tension load bearing surface 192 of the multi-plate anchor interconnect device. The anchor bearing plate 166 is also positioned such that the outer face 170 of the anchor bearing plate 166 is adjacent the outer surface 150 of the anchor enclosure member 142 and the inner face 172 of the anchor bearing plate 166 is adjacent the structure.

The coupler 182 is threaded onto the anchor member 402 and the anchor member connector 180. The anchor member connector 180 is securely held and the coupler 182 is rotated so as to draw the anchor member connector 180 and the anchor member 402 together in tension in a manner well known to those skilled in the art. The anchor member connector 180 bears on the top surface 168 of the anchor bearing plate 166 which causes the bottom surface 169 of the anchor bearing plate 166 to bear on the tension load bearing surface 192 of the multi-plate anchor interconnect device 102. Since the anchor member 402 is fixedly set into the building foundation, as the coupler 182 is tightened, the anchor member connector 180, the anchor bearing plate 166, the multi-plate anchor interconnect device 102 and the building foundation are fastened together. Thus, uplift forces acting on the structure are transferred through the multi-plate anchor interconnect device 102 to the anchor structure 400 and the foundation.

It should be appreciated that different length anchor member connectors 180 can be readily employed to bridge the distance between the tension load bearing surface 192 and the anchor member 402 protruding from the building foundation so as to provide a range of motion along the first axis 156. Because of the size and rectangular shape of the cavity 154 in the anchor enclosure member 142, the anchor member connector 180 is permitted a limited freedom of movement along the second axis 160 but is still held securely by the anchor member enclosure 166. Thus, the multi-plate anchor interconnect device 102 of the present invention can accommodate a range of lateral and vertical motion without requiring rework or compromising the structural strength of the overall assembly.

An alternative embodiment of the present invention is utilized when the protrusion of the anchor member 402 is such that the anchor member 402 extends above the load bearing surface 192 of the multi-plate anchor interconnect device 102 when the multi-plate anchor interconnect device 102 is connected to a structure. In this embodiment, the multi-plate anchor interconnect device 102 is placed over the anchor member 402 such that the anchor member 402 passes through the cavity 154 of the anchor enclosure member 142. The anchor bearing plate 166 is placed on the anchor member 402 such that the anchor member 402 passes through the anchor member hole 174 and the bottom surface 169 of the anchor bearing plate 166 is adjacent the tension load bearing surface 192 of the multi-plate anchor interconnect device 102. The anchor bearing plate 166 is positioned such that the outer face 170 of the anchor bearing plate 166 is adjacent the outer surface 150 of the anchor enclosure member 142 and the inner face 172 of the anchor bearing plate 166 is adjacent the structure.

In this embodiment, the anchor structure 400 comprises the anchor member 402 and a securing fastener 194. The securing fastener 194 (not shown) is a ¾" nut internally threaded so as to mate with the anchor member 402. The securing fastener 194 is threaded onto the anchor member 402 and tightened so as to bear on the top surface 168 of the anchor bearing plate 166 thus forcing the bottom surface 169 of the anchor bearing plate 166 to bear on the tension load bearing surface 192 of the multi-plate anchor interconnect device 102 in a well known manner. Since the anchor member 402 is firmly set into the building foundation, as the securing fastener 194 is tightened, the anchor bearing plate 166, the multi-plate anchor interconnect device 102, the anchor member 402, and the building foundation are held together in compression. Thus, the multi-plate anchor interconnect device 102 attached to the structure transfers vertical compression forces from the structure through the anchor member into the foundation. By allowing the anchor member 402 to pass completely through the multi-plate anchor interconnect device 102, it can be seen that the multi-plate anchor interconnect device 102 allows for excessive protrusion of the anchor member 402 without necessitating removal of any of the anchor member 402.

Figure 13:
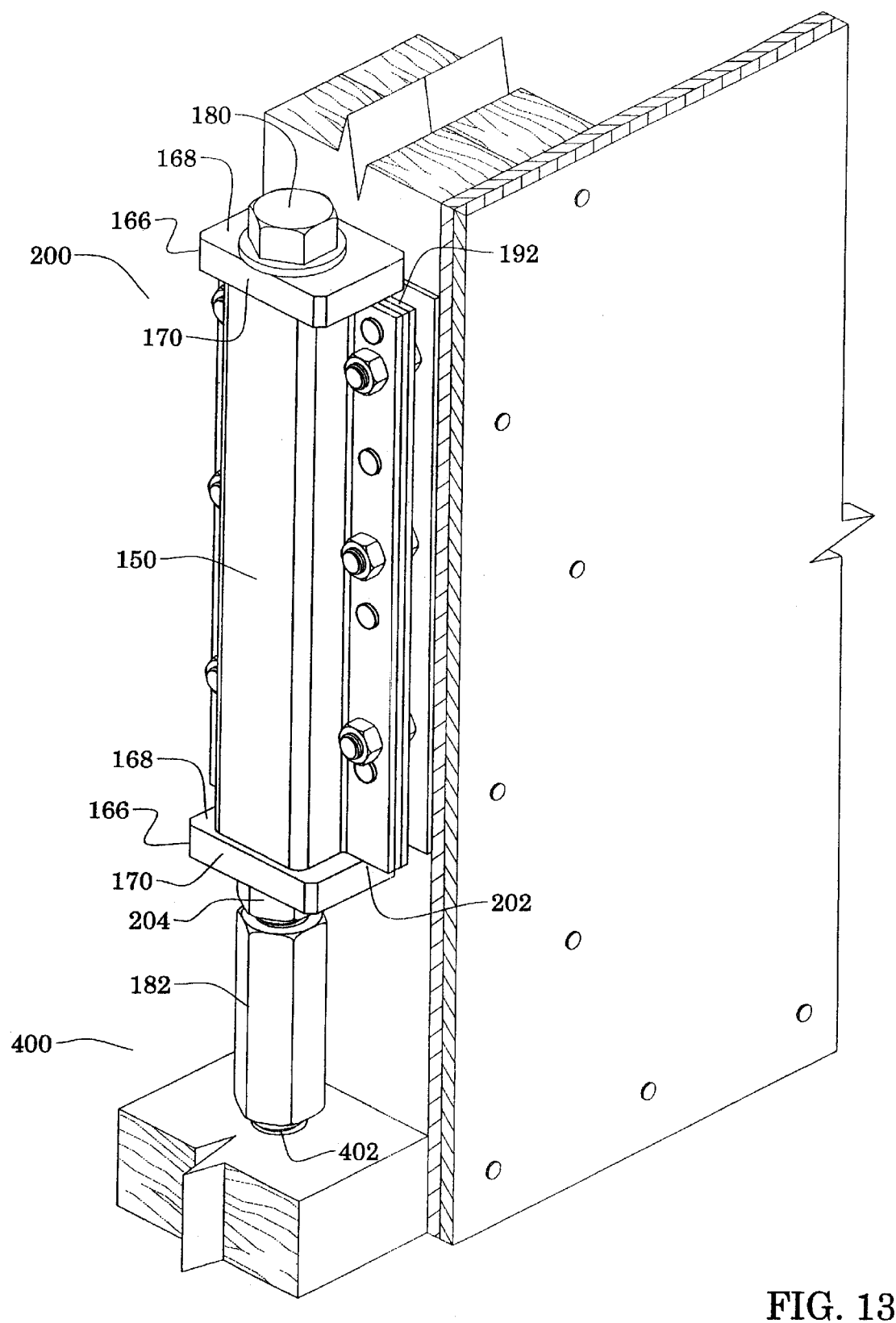
FIG. 13 shows an alternative embodiment of a multi-plate anchor interconnect device interconnecting a structure and an anchor member so as to transfer compression and tension loads and also an attached shear diaphragm.

In another alternative embodiment, the anchor interconnect device 100 interconnects a structure to an anchor member 402 such that uplift forces on the structure and the weight of the structure and its contents are transferred through the anchor interconnect device 100 to the anchor structure 400. The anchor interconnect device 100 of this embodiment comprises a multi-plate anchor interconnect device 200 as shown in FIG. 13 substantially similar to the multi-plate anchor interconnect device 102 previously described except further including provision to transfer compression as well as tension forces from the structure to the anchor structure 400.

The multi-plate anchor interconnect device 200 of this embodiment comprises the attachment member 102, reinforcing plate(s) 126, anchor member connector 180, coupler 182, assembly fasteners 184, structure fasteners 186, nails/screws 190, and tension load bearing surface 192 substantially identical to those previously described with respect to the multi-plate anchor interconnect device 102. The multi-plate anchor interconnect device 200 also comprises a load transfer plate 134 and an anchor enclosure member 142 substantially similar to the load transfer plate 134 and the anchor enclosure member 142 previously described with respect to the multi-plate anchor interconnect device 102 except that the dimensions of the load transfer plate 134 and the anchor enclosure member 142 of this embodiment are approximately 3½" by 9", i.e. substantially similar to the dimensions of the attachment member 104. The load transfer plate 134 and the anchor enclosure member 142 further comprise additional structure fastener clearance holes 136 and assembly holes 140 and 164.

The multi-plate anchor interconnect device 200 also comprises anchor bearing plates 166 substantially identical to the anchor bearing plate 166 previously described with respect to the multi-plate anchor interconnect device 102, except that the multi-plate anchor interconnect device 200 employs two anchor bearing plates 166 in a manner that will be described in greater detail below whereas the multi-plate anchor interconnect device 102 employs a single anchor bearing plate 166. The multi-plate anchor interconnect device 200 also comprises a compression fastener 204. The compression fastener in this embodiment is a ¾" hex nut internally threaded to mate with the anchor member connector 180 in a similar manner to the coupler 182. It should be appreciated by one skilled in the art that the compression fastener 204 can also comprise a flat washer, lock washer, castle nut, and/or self-locking nut.

The multi-plate anchor interconnect device 200 also defines a compression load bearing surface 202. The compression load bearing surface 202 is positioned opposite the tension load bearing surface 192 so as to comprise the bottom end 110 of the attachment member 104, the load transfer plate 134, and the bottom end 146 of the anchor enclosure member 142 as shown in FIG. 13.

The multi-plate anchor interconnect device 200 is attached to the structure in a manner substantially identical to the manner previously described with respect to the multi-plate anchor interconnect device 102. The anchor member connector 180 then is placed through a first and a second anchor bearing plates 166 such that the anchor member connector 180 bears on the top surface 168 of the first anchor bearing plate 166. The anchor member connector 180 and first and second anchor bearing plates 166 are further positioned such that the anchor member connector 180 passes through the cavity 154 of the anchor enclosure member 142 and such that the bottom surface 169 of the first anchor bearing plate 166 is adjacent the tension load bearing surface 192 of the multi-plate anchor interconnect device 200 and the top surface 168 of the second anchor bearing plate 166 is adjacent the compression load bearing surface 202. The anchor bearing plates 166 are also positioned such that the outer faces 170 of the anchor bearing plates 166 are adjacent the outer surface 150 of the anchor enclosure member 142 and the inner faces 172 of the anchor bearing plates 166 are adjacent the structure.

The compression fastener 204 is then threaded onto the anchor member connector 180 and then the coupler 182 is threaded onto the anchor member 402 and the anchor member connector 180. The anchor member connector 180 is securely held and the coupler 182 is rotated so as to draw the anchor member connector 180 and the anchor member 402 together in tension in a manner well known to those skilled in the art. Then the compression fastener 204 is tightened against the bottom surface 169 of the second anchor bearing plate 166 so as to induce top surface 168 of the second anchor bearing plate 166 to bear against the compression load bearing surface 202.

The anchor member connector 180 bears on the top surface 168 of the first anchor bearing plate 166 which causes the bottom surface 169 of the first anchor bearing plate 166 to bear on the tension load bearing surface 192 of the multi-plate anchor interconnect device 200. In addition, the compression fastener 204 is attached to the anchor member connector 180 and also bears on the bottom surface 169 of the second anchor bearing plate 166 so as to induce the top surface 168 of the second anchor bearing plate 166 to bear on the compression load bearing surface 202 of the multi-plate anchor interconnect device 200. Since the multi-plate anchor interconnect device 200 is securely attached to the structure and is comprised of rigid pieces interconnected to form an assembly adapted to transfer forces with minimal distortion, compression and tension forces on the structure are transferred through the multi-plate anchor interconnect device 200 to the anchor member 402.

It will be appreciated from the preceding description and a careful consideration of FIGS. 10,11,12, and 13 that the multi-plate anchor interconnect devices 102 and 200 are adapted to present a minimal moment arm over which tension and compression forces can act on the multi-plate anchor interconnect devices 102 and 200 and be transferred to/from the structure. In particular, the attachment member 104 is attached immediately adjacent a first reinforcing plate 126 which is attached immediately adjacent the structure. The structure fasteners 186 bear on the front surface 114 of the attachment member 104 and a second reinforcing plate 126. Thus the proximal faces 450 of the ends of the structure fasteners 186, shown in FIGS. 10a and b, are at most the combined thicknesses of the attachment member 104 and a reinforcing plate 126, from the surface of the structure, which in this embodiment is less than approximately ¼. Thus, the structure fasteners 186 are presented with no more than approximately ¼" over which incident tension and compression forces could bend the structure fasteners 186.

In addition, the cavity 154, through which the anchor structure 400 passes and is attached, is adapted to be a minimal distance from the surface of the structure and thus the point of restraint. In this embodiment, the centerline of the anchor member connector 180 and thus the anchor structure 400 is approximately 1⅛" from the surface of the structure when the multi-plate anchor interconnect devices 102 and 200 are attached to the structure in the manner previously described. The multi-plate anchor interconnect devices 102 and 200 are restrained by the anchor structure 400 and by the proximal faces 450 of the structure fasteners 186 to the structure. Thus, the multi-plate anchor interconnect devices 102 and 200 of the embodiments herein described provide less than approximately 1" of moment arm over which tension and compression forces could distort or damage the multi-plate anchor interconnect devices 102 and 200. It will be appreciated by one skilled in the art that providing a minimal moment arm over which tension and compression forces can act increases the strength of the multi-plate anchor interconnect devices 102 and 200 and the improves the ability of the multi-plate anchor interconnect devices 102 and 200 to transfer tension and compression forces from the structure to the anchor structure 400 with minimal distortion and damage to the multi-plate anchor interconnect devices 102 and 200 and the structure.

Figure 14:
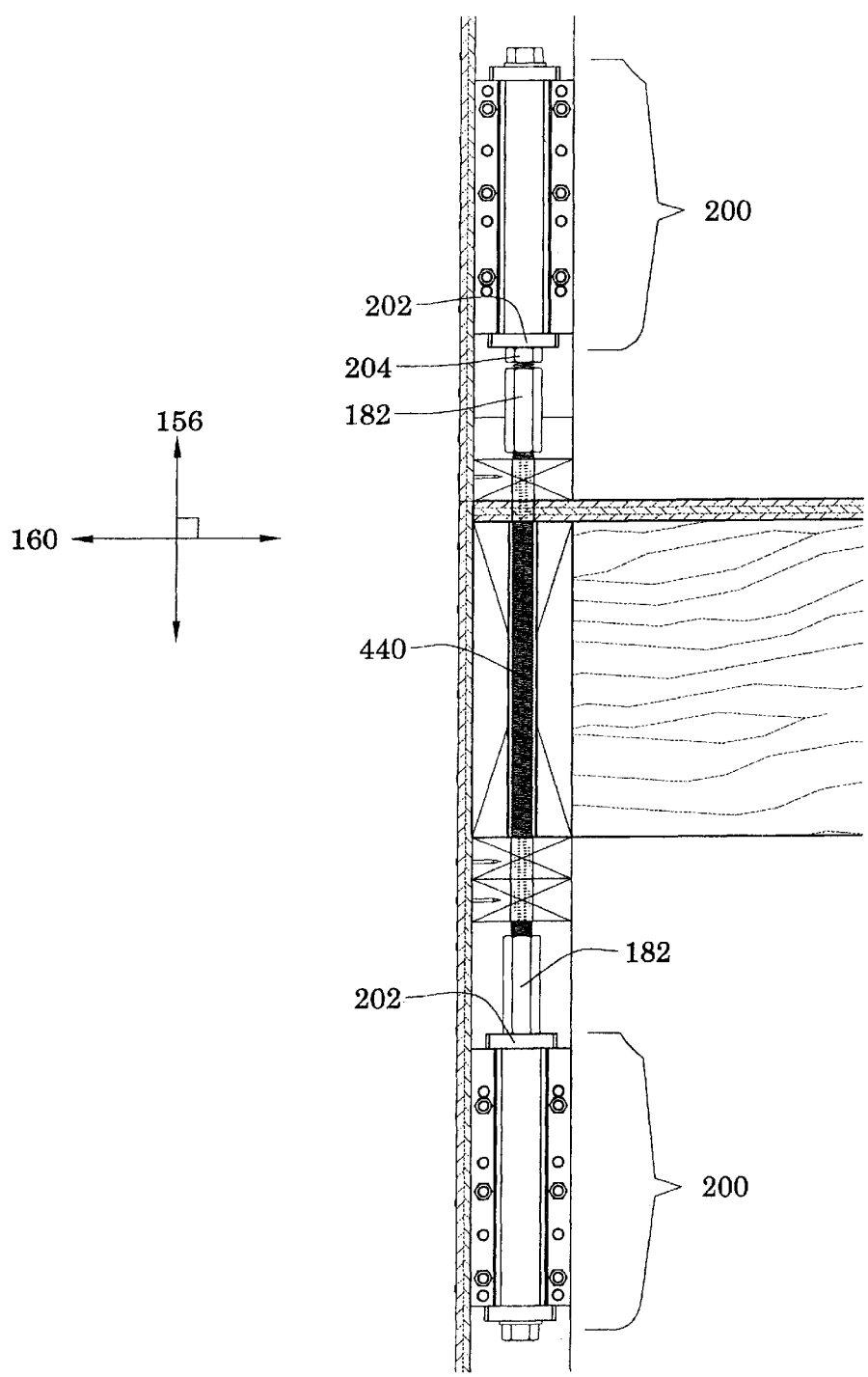
FIG. 14 is a cutaway cross section detail view of an embodiment of two multi-plate anchor interconnect devices interconnecting shear panel building members of a multi-story building.

FIG. 14 shows an embodiment of two multi-plate anchor interconnect devices 200 interconnecting building members in a multi-story building. In this embodiment, a first multi-plate anchor interconnect devices 200 is attached to upper structure members in the manner previously described. The structure members, in this embodiment, comprise two 2"×4" wood studs placed back-to-back in the manner shown in FIG. 15. A second multi-plate anchor interconnect device 200 is connected to lower structure members. The multi-plate anchor interconnect devices 200 are also connected to each other via a threaded extension rod 440. The threaded extension rod 440 is an elongate ¾" rigid metal rod, externally threaded to mate with the couplers 182 and the compression fasteners 204 and sized so as to bridge the distance between the two multi-plate anchor interconnect devices 200. It can be appreciated that tension and compression forces acting upon either the upper or lower structure members will be transferred by the multi-plate anchor interconnect devices 200 and the threaded extension rod 440 to the other structure members.

Figure 15:
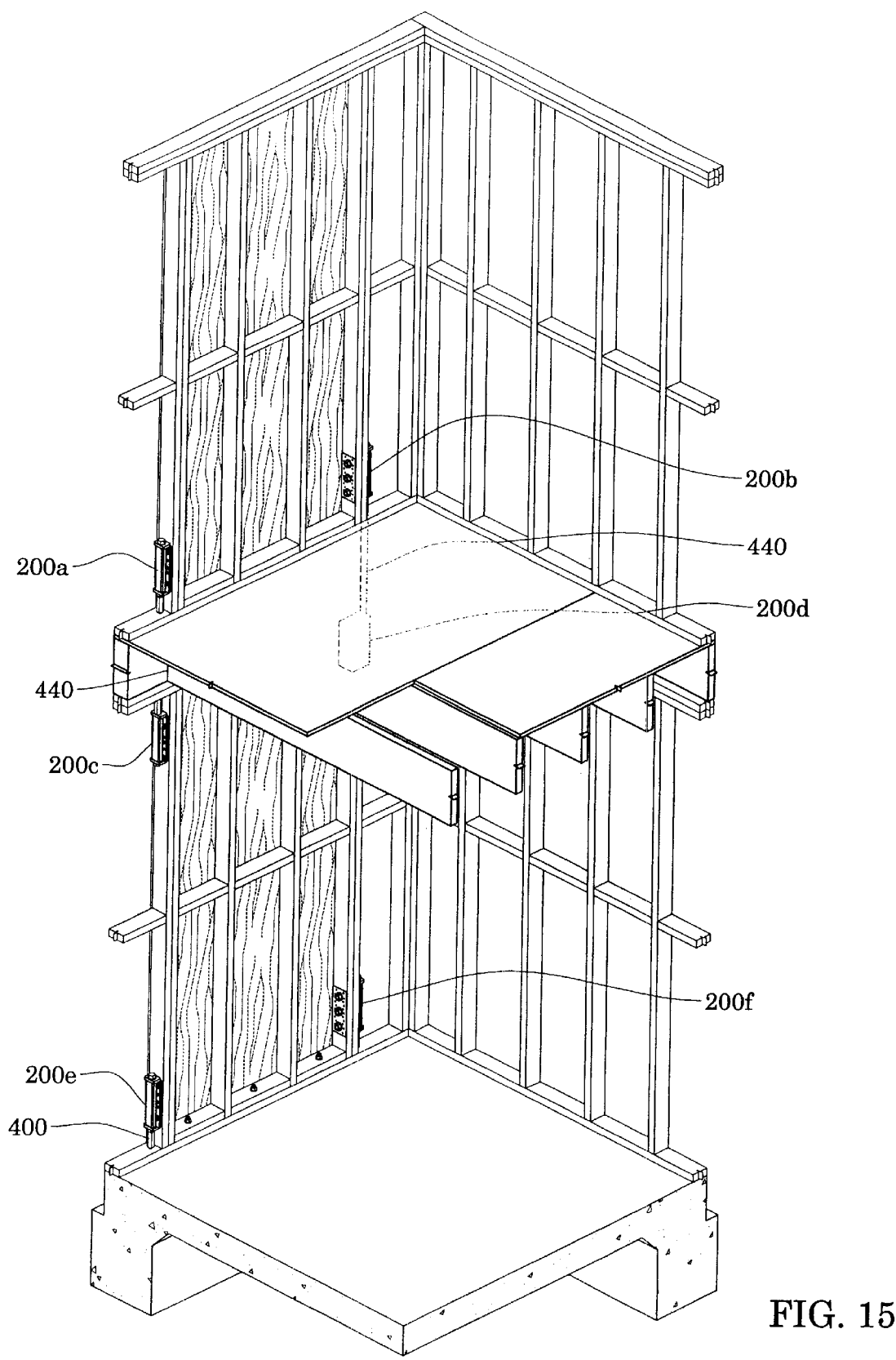
FIG. 15 shows a plurality of multi-plate anchor interconnect devices interconnecting shear panel building members in a multi-story building.

FIG. 15 illustrates an embodiment of employing the multi-plate anchor interconnect device 200 to interconnect a plurality of structure members so as to transfer compression and tension forces from upper and lower structure members to a plurality of anchor structures 400 adjacent a foundation. The multi-plate anchor interconnect devices 200a and b are connected to the upper structure members and the multi-plate anchor interconnect devices 200c and d are connected to the lower structure members in the manner previously described. The multi-plate anchor interconnect devices 200a and b are connected to the multi-plate anchor interconnect devices 200c and d respectively with threaded extension rods 440 in the manner previously described. Thus, the upper and lower structure members are connected by the multi-plate anchor interconnect devices 200a–d and the threaded extension rods. Thus, tension and compression forces acting on the upper structure members are transferred by the multi-plate anchor interconnect devices 200a–d and the threaded extension rods 440 to the lower structure members and vice versa.

The multi-plate anchor interconnect devices 200e and f are connected to the lower structure members and to the anchor structures 400 in the manner previously described. The anchor structures are fixedly attached to the foundation. Thus, tension and compression forces on the lower structure members are transferred via the multi-plate anchor interconnect devices 200e and f to the anchor structures 400 and thus the foundation. Thus, tension and compression forces acting on the upper and lower structure members are transferred by the multi-plate anchor interconnect devices 200a–f and the threaded extension rods to the anchor structures 400 and thus the foundation. It should be appreciated that the previous description of the anchor interconnect devices 100 and illustration in FIGS. 14 and 15 can be readily extended to additional structure stories by one skilled in the art.

Figure 16:
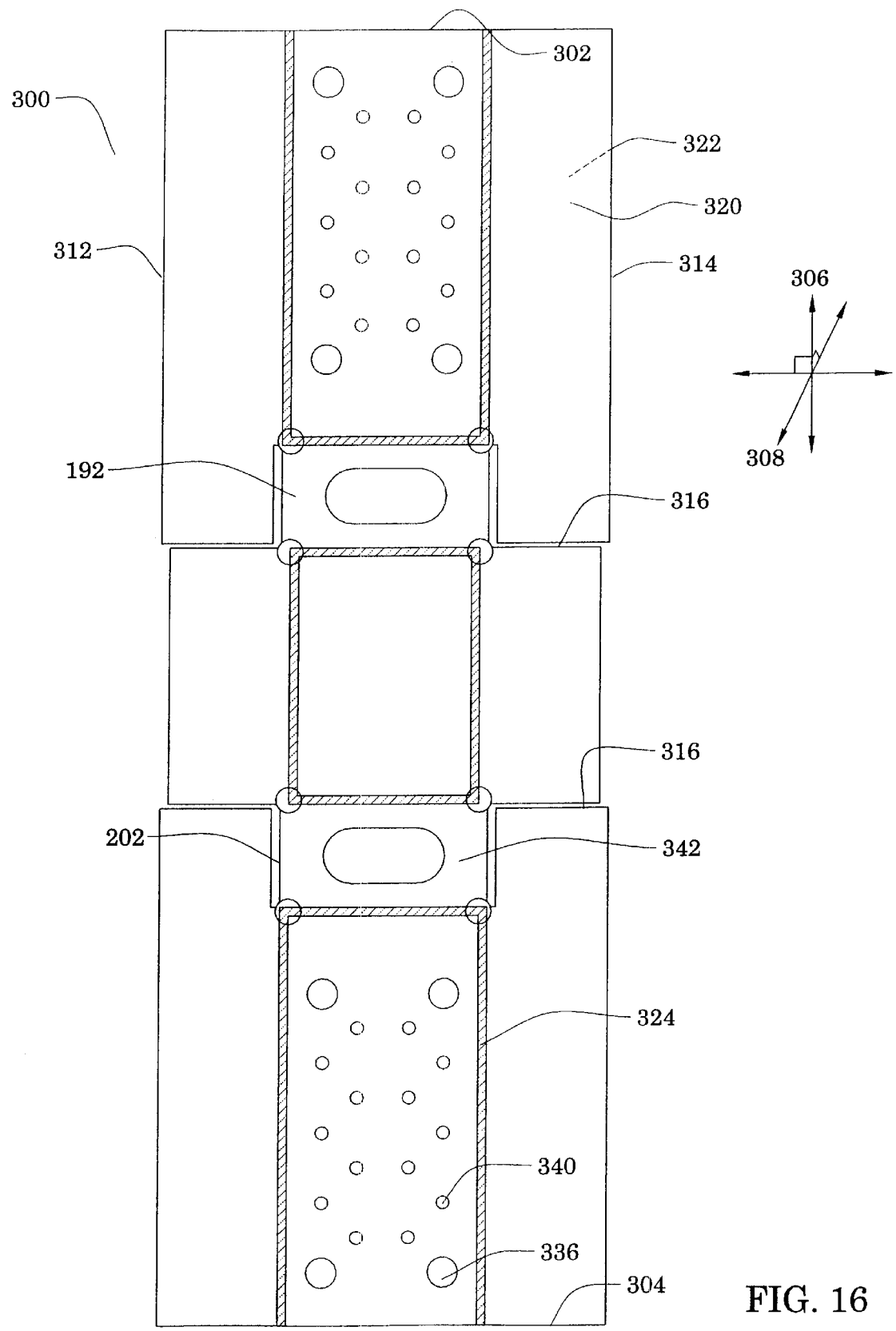
FIG. 16 shows a flattened front view of a folded anchor interconnect device which is another embodiment of the same concepts for lateral adjustability and both compressive and tension capacities.
Figure 17:
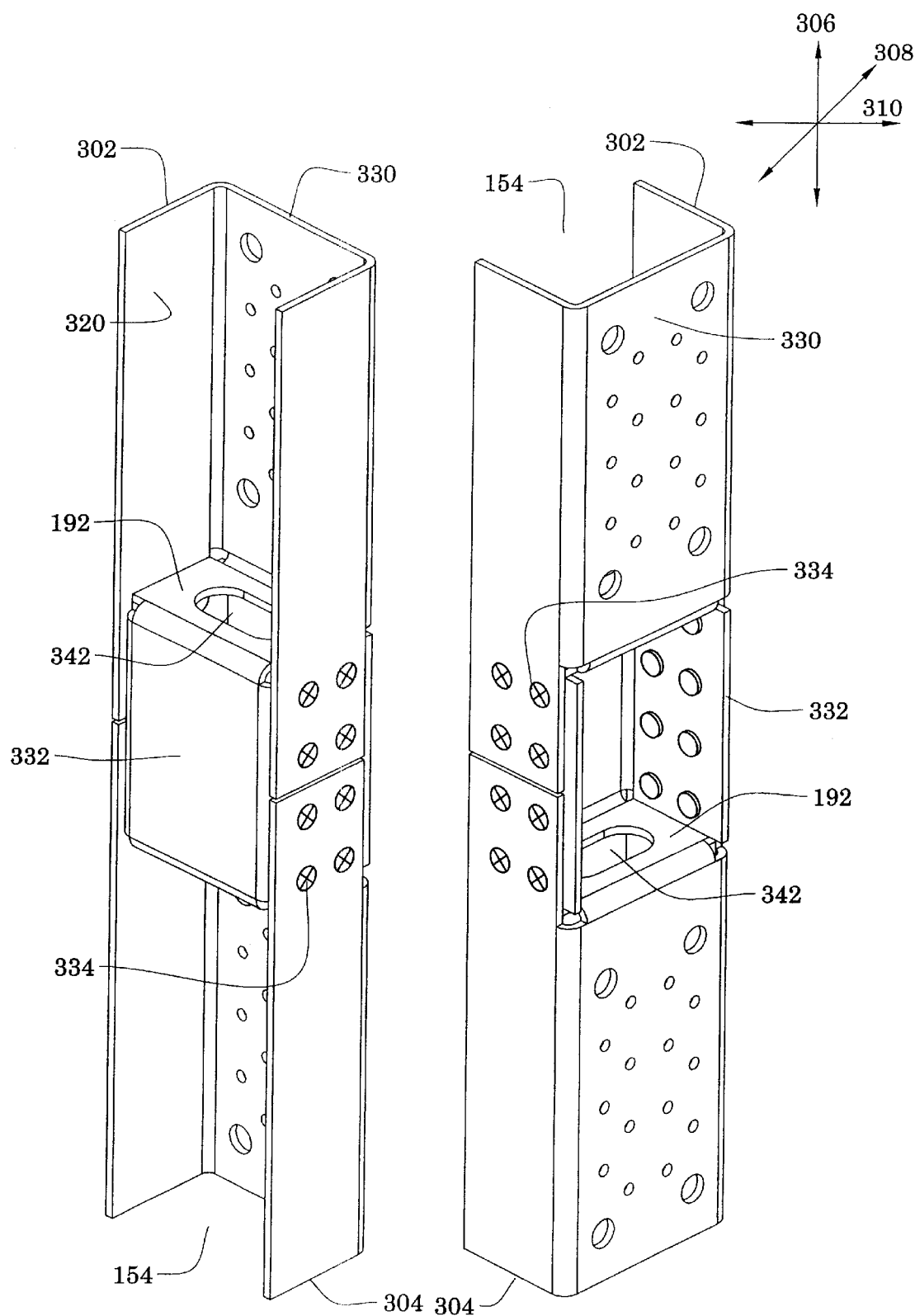
FIG. 17 shows two isometric views of a finished folded anchor interconnect device.

In another embodiment, the anchor interconnect device 100 comprises a folded anchor interconnect device 300 as shown in FIGS. 16 and 17. The folded anchor interconnect device 300 is formed from a flat sheet of 10 steel approximately 7" by 19". The folded anchor interconnect device 300 has a first end 302, a second end 304 opposite the first end 302, a first edge 312, a second edge 314 opposite the first edge 312, an inside 320 and an outside 322 opposite the inside 320. The folded anchor interconnect device 300 defines a first axis 306 extending parallel to the major axis of the flat sheet of steel between the first end 302 and the second end 304 as well as a second axis 310 perpendicular to the first axis 306 and in the plane of the flat sheet and a third axis 308 perpendicular to the first 306 and second 310 axes.

The folded anchor interconnect device 300 also comprises a plurality of cuts 316 as shown in FIG. 16 so as to pass through the sheet steel. Vertical cuts 316 are provided along the first axis 306 so as to extend from approximately 5⅞" from the first end 302 to 7⁷⁄₁₆" from the first end 302 and 1¾" from the first edge 312 and 1¾" from the second edge 314. Vertical cuts 316 are also provided so as to extend from 5⅞" from the second end 304 to 7⁷⁄₁₆" from the second end 304 and 1¾" from the first edge 312 and 1¾" from the second edge 314. Horizontal cuts 316 are provided along the second axis 310 so as to extend from the first edge 312 to approximately 1¾" from the first edge 312 and from the second edge 314 to approximately 1¾" from the second edge 314 and also so as to be positioned 7⁷⁄₁₆" from the first end 302 and 7⁷⁄₁₆" from the second end 304. The cuts 316 are provided via an oxy-acetylene cutting torch, plasma cutter, laser, or other known method of cutting sheet metal. The cuts 316 provide relief in the flat sheet of steel so as to facilitate folding the sheet of steel to form the folded anchor interconnect device 300 in a manner that will be described in greater detail below.

The folded anchor interconnect device 300 also comprises a plurality of fold lines 324 as shown in FIG. 16. The fold lines 324 are regions of the flat sheet of steel and define axes along which the flat sheet of steel is folded to form the folded anchor interconnect device 300. Vertical fold lines 324 are provided so as to extend from the first end 302 to the second end 304 along the first axis 306 and further so as to be positioned approximately 1¾" from the first edge 312 and the second edge 314. It should be appreciated that the vertical fold lines 324 are approximately collinear with the vertical cuts 316. The folded anchor interconnect device 300 also comprises horizontal fold lines 324 along the second axis 310 and extending from approximately 1¾" from the first edge 312 to 1¾" from the second edge 314 and further positioned so as to be located approximately 5⅞" from the first end 302 and the second end 304 and also 7½" from the first end 302 and the second end 304.

The folded anchor interconnect device 300 comprises a tension load bearing surface 192 and a compression load bearing surface 202. The tension 192 and compression 202 load bearing surfaces transfer tension and compression loads from a structure, through the folded anchor interconnect device 300, to an anchor structure 400 in a manner that is substantially similar to that previously described with respect to the multi-plate anchor interconnect device 200, but that will also be described in greater detail below. The tension 192 and compression 202 load bearing surfaces are defined between the vertical cuts 316 and between the horizontal fold lines 324 as shown in FIG. 16 as the shaded regions.

The folded anchor interconnect device 300 comprises structure fastener holes 336. The structure fastener holes 336 provide clearance for structure fasteners 186 to pass through and secure the folded anchor interconnect device 300 to a structure in a manner that will be described in greater detail below. In one embodiment, the structure fastener holes 336 comprise through-going holes approximately ²⁵⁄₃₂" in diameter. In another embodiment, illustrated in FIG. 16, the folded anchor interconnect device also includes a plurality of nail/screw holes 340. The nail/screw holes 340 provide clearance for fasteners such as nails or screws to pass through and secure the folded anchor interconnect device 300 to a structure in a manner that will be described in greater detail below.

The folded anchor interconnect device 300 comprises an attachment member 330 shown in FIG. 17, which attaches the folded anchor interconnect device 300 to a structure in a manner that will be described in greater detail below. The attachment member 330 is formed from the flat sheet of steel wherein the flat sheet of steel is folded along the vertical fold lines 324 such that the material defined between the vertical fold lines 324 and the first 312 and second 314 edges and the horizontal cuts 316 and the first 302 and second 304 ends forms two planes, parallel to the first axis 306, perpendicular to the second axis 314, and extending in a first direction along the third axis 308 and further such that the sheet of steel defines a u-shaped cavity 154 extending along the first axis 306 from the first end 302 to the second end 304 such that the interior of the cavity 154 comprises the inside 320 and the exterior of the cavity 154 comprises the outside 322.

The folded anchor interconnect device 300 also comprises anchor structure clearance holes 342. The anchor clearance holes 342 are elongate through-going holes located substantially in the center of area of the tension 192 and the compression 202 load bearing surfaces. The anchor structure clearance holes 342 are approximately ¾" by 1½" ovals. The anchor structure clearance holes 342 provide clearance for the anchor structure 400 such that the anchor structure 400 has a minimal freedom of motion along the third axis 308 and approximately ¾" of freedom of motion along the second axis 310. The folded anchor interconnect device 300 is further restricted to minimal freedom of motion along the first axis 306 in a manner that will be better appreciated following a description of the manner of securing the folded anchor interconnect device 300 to a structure and the anchor structure 400.

The folded anchor interconnect device 300 also comprises a seat member 332. The seat member 332 comprises the tension 192 and compression 202 load bearing areas. The seat member 332 is connected to the attachment member 330 and to the anchor structure 400 such that tension and compression forces on the structure are transferred through the folded anchor interconnect device 300 to the anchor structure 400 in a manner that will be described in greater detail below.

The seat member 332 is formed from the sheet of steel wherein the sheet of steel is also folded along the vertical fold lines 324 such that the material defined between the vertical fold lines 324 and the first 312 and second 314 edges and between the horizontal cuts 316 forms two planes, parallel to the first axis 306, perpendicular to the second axis 310, and extending in a second direction along the third axis 308. The sheet of steel is further folded along the horizontal fold lines 324 so that the tension 192 and compression 202 load bearing surfaces form two planes, parallel to the second 310 and third 308 axes, perpendicular to the first axis 306, and extending in a first direction along the third axis 308.

It can be appreciated from a consideration of the previous description and an examination of FIGS. 16 and 17 that a portion of the cavity 154 will be adjacent the portions of the seat member parallel to the first 306 and third 308 axes. These adjacent portions are connected together with a material joining process 334, which in this embodiment comprises clinching as previously described with respect to the multi-plate anchor interconnect device 102. In alternative embodiments, the material joining process 334 comprises welding, high strength adhesives, rivets, or other fastening methods well known in the art.

The attachment member 330 is attached to a structure in a manner substantially similar to the manner described with respect to the multi-plate anchor interconnect device 102, 200 wherein the structure fasteners 186 pass through the structure fastener holes 336 and corresponding holes in the structure. The structure fasteners 186 are tightened so as to securely attach the attachment member 330 and thus the folded anchor interconnect device 300 to the structure. In the embodiment illustrated in FIGS. 16 and 17, nails and/or screws also pass through the nail/screw holes 340 and further attach the folded anchor interconnect device 300 to the structure in a well known manner. It should be appreciated that the folded anchor interconnect device 300 reinforces the structure to which it is attached so as to inhibit buckling, bending, tearing, or other damage or distortion to the attached structure due to incident tension and compression forces.

The folded anchor interconnect device 300 is connected to the anchor structure 400 in a manner substantially similar to the manner previously described with respect to the multi-plate anchor interconnect 200 wherein the anchor member connector 180 is positioned through the anchor structure clearance holes 342 so as bear against the tension load bearing surface 192. The compression fastener 204 is then threaded onto the anchor member connector 180. The coupler 182 is then threaded onto the anchor member 402 and the anchor member connector 180. The anchor member connector 180 is securely held and the coupler 182 is tightened so as to draw the folded anchor interconnect device 300 and the attached structure to the anchor member 402 in tension. The compression fastener 204 is then tightened against the compression load bearing surface 202.

Thus, tension and compression forces acting on the structure are transferred through the folded anchor interconnect device 300 via the tension 192 and compression 202 load bearing surfaces to the anchor member connector 180 and the compression fastener 204 and thus through the coupler 182 to the anchor member 402 and the foundation. It should be appreciated that the alternative embodiments previously described with respect to the multi-plate anchor interconnect assembly 102 and 200 are also envisioned with respect to the folded anchor interconnect device 300.

The anchor interconnect device 100 comprises relatively few component pieces that are interconnected with common fasteners. The anchor interconnect device 100 attaches to a structure and the anchor structure 400 with common fasteners using common construction practices. Thus, the anchor interconnect device 100 can be readily used to secure a wall frame to a building foundation.

The component pieces of the anchor interconnect device 100 are made from stamped sheet steel and are interconnected with a plurality of common fasteners or joining methods in order to form a rigid structure. The anchor interconnect device 100 attaches to anchor structures 400 in such a way that forces are resisted along the first axis 156 in a straight line perpendicular to the building foundation. Thus, the anchor interconnect device 100 offers strength advantages to embedded metal strapping.

The configuration of the anchor interconnect device 100 and the manners of connecting the anchor interconnect device 100 to the anchor structure 400 allow a restricted freedom of motion along the plane of a foundation. Thus, the anchor interconnect device 100 accommodates misplacement of anchor structures 400 in the foundation without requiring rework or alteration to the anchor structures 400.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. An anchor interconnect device for interconnecting a structure to an anchor structure, the anchor interconnect device having a mounting surface that attaches to the structure wherein the anchor interconnect device defines a cavity that extends along a first axis that receives the anchor structure so that the anchor interconnect device can be secured to the anchor structure over a range of lateral positions along an anchor attachment surface such that, when the anchor interconnect device is secured to the anchor structure and the structure, uplift forces on the structure are transmitted through the anchor interconnect device to the anchor structure wherein the anchor attachment surface is no lower than the mounting surface, wherein the device is secured to the anchor structure so that compressive forces on the structure are transmitted through the anchor interconnecting device to the anchor structure.

2. The device of claim 1, wherein the device further comprises:
   an attachment member that has a first and a second end and attaches to the structure;
   an anchor enclosure member that has a first and a second end that attaches to the attachment member, wherein the anchor enclosure member defines a cavity that receives the anchor structure so that the anchor structure extends between the first and the second end of the anchor enclosure member; and
   a first anchor bearing plate that is coupled to the anchor member and the anchor enclosure member so that uplift forces on the structure are transmitted through the attachment member, the anchor enclosure member and the first anchor bearing plate to the anchor structure.

3. The device of claim 2, wherein the cavity defined by the anchor enclosure member has a cross-sectional area that is greater than the cross-sectional area of the portion of the anchor structure positioned within the cavity so that the anchor structure can be positioned in one of a range of positions along a first axis in the cavity.

4. The device of claim 2, further comprising a second anchor bearing plate that is coupled to the anchor structure and the anchor enclosure member so that compressive forces on the structure are transmitted through the attachment member, the anchor enclosure member and the second anchor bearing plate to the anchor structure wherein the first anchor bearing plate is mounted adjacent the first end of the anchor enclosure member and the second anchor bearing plate is mounted adjacent the second end of the anchor enclosure member so as to be coupled to the first and second ends of the anchor enclosure member respectively.

5. The device of claim 2, further comprising a load transfer plate that is interposed between the anchor enclosure member and the attachment member and secured thereto so as to facilitate load transfer between the structure and the anchor structure.

6. The device of claim 2, further comprising at least one reinforcing plate mounted to the structure and coupled to the attachment member so that when a fastener is interconnected between the at least one reinforcing plate and the attachment member, the at least one reinforcing plate transmits force from the structure to the attachment member to thereby inhibit damage to the structure as a result of interaction between the fastener and the structure.

7. The device of claim 1, wherein the cavity receives an anchor structure that is comprised of an anchor member extending out of the foundation of a building.

8. The device of claim 2, further comprising an anchor member connector that is positioned within the cavity of the anchor enclosure member and a coupler that couples to an anchor member extending out of a foundation wherein the anchor member connector, the coupler and the anchor member define the anchor structure.

9. The device of claim 8, wherein the anchor member connector and the coupler can be selected to be of a plurality of sizes thereby allowing attachment between the structure and the anchor member through the anchor interconnect device over a plurality of distances.

10. An anchor interconnect device for interconnecting a structure to an anchor structure, the anchor interconnect device having a mounting surface that attaches to the structure wherein the anchor interconnect device defines a cavity that extends along a first axis that receives the anchor structure so that the anchor interconnect device can be secured to the anchor structure over a range of lateral positions such that, when the anchor interconnect device is secured to the anchor structure and the structure, uplift and compressive forces on the structure are transmitted through the anchor interconnect device to the anchor structure wherein the device comprises:
  an attachment member that has a first and a second end and attaches to the structure;
  an anchor enclosure member that has a first and a second end that attaches to the attachment member, wherein the anchor enclosure member defines a cavity that receives a portion of the anchor structure so that the anchor structure extends from the first and the second end of the anchor enclosure member;
  a first anchor bearing plate that is coupled to the anchor structure and the anchor enclosure member so that uplift forces on the structure are transmitted through the attachment member, the anchor enclosure member and the first anchor bearing plate to the anchor structure; and
  a second anchor bearing plate that is coupled to the anchor structure and the anchor enclosure member so that compressive forces on the structure are transmitted through the attachment member, the anchor enclosure member and the second anchor bearing plate to the anchor structure.

11. The device of claim 10, further comprising an anchor member connector that is positioned within the cavity of the anchor enclosure member and a coupler that couples to an anchor member extending out of a foundation wherein the anchor member connector, the coupler and the anchor member define the anchor structure.

12. The device of claim 11, wherein the anchor member connector and the coupler can be selected to be of a plurality of sizes thereby allowing attachment between the structure and the anchor member through the anchor interconnect device over a plurality of distances.

13. The device of claim 10, wherein the first anchor bearing plate is mounted adjacent the first end of the anchor enclosure member and the second anchor bearing plate is mounted adjacent the second end of the anchor enclosure member so as to be coupled to the first and second ends of the anchor enclosure member respectively.

14. The device of claim 10, wherein the cavity defined by the anchor enclosure member has a cross-sectional area that is greater than the cross-sectional area of the portion of the anchor structure so that the anchor structure can be positioned in one of a range of positions along a first axis in the cavity.

15. The device of claim 10, further comprising a load transfer plate that is interposed between the anchor enclosure member and the attachment member and secured thereto so as to facilitate load transfer between the structure and the anchor member.

16. The device of claim 10, further comprising at least one backing plate mounted to the structure and coupled to the attachment member so that when a fastener is interconnected between the at least one backing plate and the attachment member, the at least one backing plate transmit force from the structure to the attachment member to thereby inhibit damage to the structure as a result of interaction between the fastener and the structure.

17. An anchor interconnect device for interconnecting a building structure to an anchor structure, the device comprising:
  an attachment member that defines a mounting surface that couples to the building structure, wherein the attachment member further defines a channel extending along a first axis, wherein the channel is configured to receive the anchor structure therethrough wherein the attachment member comprises:
    a mounting member that has a first and a second end and attaches to the structure; and
    an anchor enclosure member that has a first and a second end that attaches to the mounting member, wherein the anchor enclosure member defines the channel that receives the anchor structure so that the anchor structure extends from the first and the second end of the anchor enclosure member;
  a first plate member having a opening formed therein so as to extend through the first plate member, wherein the first plate member is positioned with respect to the attachment member so that the opening is in a plane that is perpendicular to the first axis of the channel so that when the anchor structure is positioned within the channel, the anchor structure extends through the opening of the plate member; and
  a securing member that interconnects the plate member, the anchor structure and the attachment member so that when the attachment member is secured to the building structure, forces on the building structure are transmitted through the attachment member and the first plate member to the anchor structure and wherein the channel and the first plate member are configured so that the anchor structure can be interconnected to the first plate member and the attachment member over a range of positions extending along a second axis transverse to the first axis, further comprising a second plate member that positioned the second end of the anchor enclosure member and is coupled to the anchor structure and the anchor enclosure member so that compression forces on the structure are transmitted through the mounting member, the anchor enclosure member and the second anchor bearing plate to the anchor structure wherein the first plate member is positioned on a first end of the anchor enclosure member and is coupled to the anchor structure and the anchor enclosure member so that uplift forces on the structure are transmitted through the mounting member, the anchor enclosure member and the first anchor bearing plate to the anchor structure.

18. The device of claim 17, wherein the channel receives an anchor structure that is comprised of an anchor member extending out of the foundation of a building.

19. The device of claim 17, further comprising an anchor member connector that is positioned within the cavity of the anchor enclosure member and a coupler that couples to an anchor member extending out of a foundation wherein the anchor member connector, the coupler and the anchor member define the anchor structure.

20. The device of claim 19, wherein the anchor member connector and the coupler can be selected to be of a plurality of sizes thereby allowing attachment between the structure and the anchor member through the anchor interconnect device over a plurality of distances.

21. An assembly for transmitting force exerted on an upper floor of a building to an anchor member mounted in the foundation of a building, the assembly comprising:
  a first anchor interconnect device mounted to a structure of the upper floor of the building, the first anchor interconnect device having a first mounting member that attaches to the structure of the upper floor of the building, a first anchor enclosure member that defines a channel that extends along a first axis parallel to the direction of the structure of the upper floor of the building a first plate member and an interconnect rod that is attached to the first plate member so as to extend through the channel in the first anchor enclosure member, wherein the first plate member and the first anchor enclosure member are configured to permit the interconnect rod to be coupled to the first anchor enclosure member over a range of positions that are transverse to the first axis;

a second anchor interconnect device mounted to a structure of the lower floor of the building, the second anchor interconnect device having a second mounting member that attaches to the structure of the lower floor of the building, a second anchor enclosure member that defines a channel that extends along a first axis parallel to the direction of the structure of the lower floor of the building a second plate member and wherein the interconnect rod extends from the first anchor enclosure member to the second anchor enclosure member and attached to the second plate member so as to extend through the channel in the second anchor enclosure member, wherein the first plate member and the first anchor enclosure member are configured to permit the anchor member to be coupled to the second anchor enclosure member over a range of positions that are transverse to the first axis so that when the interconnect rod is attached to the first anchor interconnect device on the upper floor and the second anchor interconnect device on the lower floor, forces on the upper floor are transmitted to the structure on the lower floor; and a third anchor interconnect assembly attached to the stud of the lower floor so as to interconnect the stud of the lower floor to an anchor member positioned within the foundation of the building so that forces exerted on the upper floor of the building are transmitted through the first and second anchor interconnect members, the interconnecting rod, the structure of the lower floor of the building and the third anchor interconnect assembly to the anchor member.

22. The assembly of claim 21, wherein the third anchor interconnect member includes a third mounting member that attaches to the structure of the lower floor of the building, a third anchor enclosure member that defines a channel that extends along a first axis parallel to the direction of the structure of the lower floor of the building a third plate member.

23. The assembly of claim 22, wherein the anchor member extends into the channel defined by the third anchor enclosure member.

24. The assembly of claim 22, further comprising an anchor member connector that is positioned within the cavity of the third anchor enclosure member and a coupler that couples to an anchor member extending out of the foundation.

25. The assembly of claim 24, wherein the anchor member connector and the coupler can be selected to be of a pluralityg of sizes thereby allowing attachment between the structure of the lower floor of the building and the anchor member over a plurality of distances.

26. The assembly of claim 22, wherein the first anchor enclosure member has an upper and a lower end and wherein the first plate member is attached to the upper end of the first anchor enclosure member so as to transfer uplift forces to the second anchor interconnect device.

27. The assembly of claim 26, further comprising a fourth plate member that is attached to the interconnect rod and the lower end of the first anchor enclosure member so as to transfer compression forces to the second anchor interconnect device.

28. The assembly of claim 22, wherein the second anchor enclosure member has an upper and a lower end and wherein the second plate member is attached to the lower end of the second anchor enclosure member so as to transfer uplift forces from the first anchor interconnect device to the structure of the lower floor.

29. The assembly of claim 28, further comprising a fifth plate member that is attached to the interconnect rod and the upper end of the second anchor enclosure member so as to transfer compression forces from the first anchor interconnect device to the structure of the lower floor.

30. The assembly of claim 22, wherein the third anchor enclosure member has an upper and a lower end and wherein the third plate member is attached to the upper end of the first anchor enclosure member so as to transfer uplift forces from the structure of the lower wall to the anchor member.

31. The assembly of claim 30, further comprising a sixth plate member that is attached to the interconnect rod and the lower end of the third anchor enclosure member so as to transfer compression forces from the structure of the lower wall to the anchor member.

32. A hold down device for interconnecting a structure to an anchor member, the device comprising:

a channel member defining a first surface and an elongate cavity, wherein the first surface is adapted to be attached to the structure to be anchored; and an integral seating member positioned within the elongate cavity of the channel member, wherein the seating member defines two surfaces that are perpendicular to the axis of the elongate cavity so as to be substantially parallel to each other and wherein an elongate opening is formed in each of the two surfaces that are adapted to receive an anchor member therein, wherein the hold down device can be attached to the anchor member over a range of positions defined by the elongate openings in the two surfaces of the seating member.

33. The device of claim 32, wherein the channel member is formed of a flat elongate sheet of metal that is bent so as to form a U-shaped channel defining the elongate cavity.

34. The device of claim 33, wherein the seating member is formed of a flat sheet of metal having a first and a second end surfaces, wherein the elongate openings are formed in the first and second end surfaces and wherein the first and second end surfaces are bent so as to be parallel with each other.

35. The device of claim 34, wherein the channel member and the seating member are formed from the same flat sheet of metal.

36. The device of claim 35, wherein the seating member is clinched within the elongate opening defined by the channel member.

37. An anchor interconnect device for interconnecting a building structure to an anchor structure, the device comprising:

a mounting member having a first surface and a second surface, wherein the mounting member defines at least one mounting surface and an aperture adjacent the first surface wherein the aperture is sized so as to receive at least one connecting device, wherein the at least one connecting device extends through the mounting member so as to secure the mounting member to the building structure so that the at least one connecting device is positioned with respect to the building structure to thereby reduce the moment arm on the at least one connecting device;

an anchor enclosure member mounted to the mounting surfaces of the mounting member so as to extend outward therefrom wherein the anchor enclosure member has a first and a second end that attaches to the mounting member, wherein the anchor enclosure member defines a channel extending along a first axis, wherein the channel is configured to receive the anchor structure therethrough;

a first plate member having an opening formed therein so as to extend through the first plate member, wherein the first plate member is positioned with respect to the anchor enclosure member so that the opening is in a plane that is perpendicular to the first axis of the channel so that when the anchor structure is positioned within the channel, the anchor structure extends through the opening of the first plate member wherein the anchor enclosure member and the first plate member are configured so that the anchor structure can be interconnected to the first plate member and the anchor enclosure member over a range of positions extending along a second axis transverse to the first axis;

a securing member that interconnects the first plate member, the anchor structure and the anchor enclosure member so that when the mounting member is secured to the building structure, forces on the building structure are transmitted through the mounting member, the anchor enclosure member and the first plate member to the anchor structure wherein the first plate member is positioned on a first end of the anchor enclosure member and is coupled to the anchor structure and the anchor enclosure member so that uplift forces on the structure are transmitted through the mounting member, the anchor enclosure member and the first anchor bearing plate to the anchor structure; and a second plate member that positioned the second end of the anchor enclosure member and is coupled to the anchor structure and the anchor enclosure member so that compression forces on the structure are transmitted through the mounting member, the anchor enclosure member and the second anchor bearing plate to the anchor structure.

38. The device of claim 37, wherein the mounting member comprises a unitary piece of metal having an indentation running the length of the member so as to define the aperture and wherein the indentation is bordered by flanges that define the at least one mounting surface.

39. The device of claim 38, wherein the channel receives an anchor structure that is comprised of an anchor member extending out of the foundation of a building.

40. The device of claim 38, further comprising an anchor member connector that is positioned within the cavity of the anchor enclosure member and a coupler that couples to an anchor member extending out of a foundation wherein the anchor member connector, the coupler and the anchor member define the anchor structure.

41. The device of claim 40, wherein the anchor member connector and the coupler can be selected to be of a plurality of sizes thereby allowing attachment between the structure and the anchor member through the anchor interconnect device over a plurality of distances.

* * * * *